US011842308B2

(12) United States Patent
Nomura et al.

(10) Patent No.: US 11,842,308 B2
(45) Date of Patent: Dec. 12, 2023

(54) COMPUTER SYSTEM AND METHOD FOR MANAGING DATA OF AN EXECUTED WORKFLOW

(71) Applicant: Hitachi, Ltd., Tokyo (JP)

(72) Inventors: Ken Nomura, Tokyo (JP); Mitsuo Hayasaka, Tokyo (JP); Mutsumi Hosoya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 581 days.

(21) Appl. No.: 17/097,366

(22) Filed: Nov. 13, 2020

(65) Prior Publication Data

US 2021/0166165 A1 Jun. 3, 2021

(30) Foreign Application Priority Data

Dec. 2, 2019 (JP) .................................. 2019-217964

(51) Int. Cl.
*G06F 3/06* (2006.01)
*G06Q 10/0633* (2023.01)

(52) U.S. Cl.
CPC ....... *G06Q 10/0633* (2013.01); *G06F 3/0604* (2013.01); *G06F 3/0652* (2013.01); *G06F 3/0688* (2013.01); *G06F 3/0689* (2013.01)

(58) Field of Classification Search
CPC .... G06F 3/0604; G06F 3/0652; G06F 3/0688; G06F 3/0689
See application file for complete search history.

(56) References Cited

U.S. PATENT DOCUMENTS

| 11,221,986 | B2 * | 1/2022 | Mizuno | G06F 16/24564 |
| 2012/0278578 | A1 * | 11/2012 | Castillo | G06F 16/273 |
| | | | | 711/E12.002 |
| 2016/0092490 | A1 * | 3/2016 | Shimozono | G06F 3/067 |
| | | | | 707/688 |
| 2018/0088987 | A1 * | 3/2018 | Foebel | G06F 11/1479 |
| 2018/0218114 | A1 * | 8/2018 | Wesselman | G06F 16/13 |
| 2019/0213198 | A1 * | 7/2019 | Kannan | G06F 16/254 |
| 2019/0287655 | A1 * | 9/2019 | Wesselman | G16B 20/00 |

FOREIGN PATENT DOCUMENTS

JP 2017-010376 A 1/2017

* cited by examiner

*Primary Examiner* — Ryan Bertram
(74) *Attorney, Agent, or Firm* — BAKER BOTTS L.L.P.

(57) ABSTRACT

A computer system stores management information that manages a workflow and a deletion flag that indicates deletion of data in the workflow hidden from a user. The computer system executes a workflow that includes one or more processes that convert input data into output data. The computer system includes a lineage of the executed workflow including information of the input data and the output data in the management information. The computer system deletes data selected from data in the executed workflow, and sets the deletion flag of the selected data in the management information. The computer system, in response to an access to first data to which the deletion flag is set, regenerate the first data based on the management information and removes the deletion flag of the first data in the management information.

13 Claims, 19 Drawing Sheets

FIG. 6A

Workflow Definition Table (600)

| FLOW NUMBER (611) | PROCESS NAME (612) | INPUT DATA (613) | OUTPUT DATA (614) | LINK (615) | FLOW SETTING (616) | REFERENCE COUNTER (617) |
|---|---|---|---|---|---|---|
| W001 | PROCESS A | FIRST GENERATION DATA A, FIRST GENERATION DATA B | SECOND GENERATION DATA | L001 PREVIOUS: NONE NEXT: L002 | NONE | 1 (620) |
| | PROCESS B | SECOND GENERATION DATA | THIRD GENERATION DATA | L002 PREVIOUS: L001 NEXT: NONE | LOCATION: Public COMPUTER: A NUMBER OF NODES: 8 | 0 (621) |
| ... | ... | ... | ... | ... | ... | ... |

FIG. 6B

Lineage Table (601)

| LINEAGE NUMBER (631) | WORKFLOW NUMBER (632) | LINK NUMBER (633) | EXECUTION TIME (634) | OUTPUT DATA STORAGE DESTINATION (635) | PROCESS RESULT (636) |
|---|---|---|---|---|---|
| P001 | W001 | L001 | 2019/06/12 13:05:01– 2019/06/12 13:05:03 | S200 | SUCCESSFUL PROCESS TIME: t1 PROCESS COST: c1 (640) |
| | | L002 | 2019/06/12 13:05:03– 2019/06/12 13:06:25 | S201 | SUCCESSFUL PROCESS TIME: t2 PROCESS COST: c2 (641) |
| ... | | | | | ... |

FIG. 9

Storage Configuration Information Table (900)

| DATA STORAGE REGION IDENTIFIER (901) | TIER INFORMATION (902) | STORAGE DEVICE INFORMATION (903) | |
|---|---|---|---|
| S1 ... S9999 | IDENTIFIER: TIER 1<br>PROTOCOL: REST<br>VERSION MANAGEMENT: PRESENT<br>Read PERFORMANCE INFORMATION:···<br>Write PERFORMANCE INFORMATION:··· | IDENTIFIER: DEV01<br>CAPACITY: 1 TByte<br>TYPE: RAID6 (NVMe) | 910 |
| S10000 ... S39999 | IDENTIFIER: TIER 2<br>PROTOCOL: NFS<br>VERSION MANAGEMENT: PRESENT<br>Read PERFORMANCE INFORMATION:···<br>Write PERFORMANCE INFORMATION:··· | IDENTIFIER: DEV02<br>CAPACITY: 100 TByte<br>TYPE: Public-JBOD (SATA) | 911 |
| ... | ... | ... | |

FIG. 10

Billing Information Table (1000)

| BILLING ITEM (1001) | MONEY AMOUNT INFORMATION (1002) | |
|---|---|---|
| DATA PROCESSING COMPUTER (A) | $0.1 / hour | 1010 |
| DATA PROCESSING COMPUTER (B) | $0.05 / hour | 1011 |
| STORAGE DEVICE | $0.01 / 1GByte/month | 1012 |
| DATA UPLOAD | $0 / 1GByte | 1013 |
| DATA TRANSFER IN CLOUD | $0.01 / 1GByte | 1014 |
| DATA DOWNLOAD | $0.02 / 1GByte | 1015 |
| OS LICENSE FEE | $0.2 / hour | 1016 |
| COMPUTING PROCESS SERVICE FEE | $0.2 / TRANSACTION | 1017 |
| ... | ... | |

FIG. 11

| SETTING ITEM | SET VALUE | |
|---|---|---|
| TARGET CAPACITY (TIER 1) | 90 % | 1110 |
| TARGET CAPACITY (TIER 2) | 10TB | 1111 |
| PRIORITY ORDER OF WRITE DESTINATION TIER | TIER 1, TIER 2, TIER 3 | 1112 |
| CONDITIONS TO DELETE DATA IN TIERS 1 TO 3 | PROCESS TIME UPPER LIMIT THRESHOLD<br>PROCESS COST UPPER LIMIT THRESHOLD<br>NO ACCESS TIME THRESHOLD<br>REAL-TIME PERFORMANCE CONDITION<br>NUMBER OF DATA USE CONDITION<br>USER EVALUATION CONDITION | 1113 |
| CONDITIONS TO MOVE DATA FROM TIER 1 TO TIER 2 | PROCESS TIME UPPER LIMIT THRESHOLD<br>PROCESS COST UPPER LIMIT THRESHOLD<br>NO ACCESS TIME THRESHOLD<br>USER EVALUATION CONDITION | 1114 |
| CONDITIONS TO MOVE DATA FROM TIER 2 TO TIER 3 | PROCESS TIME UPPER LIMIT THRESHOLD<br>PROCESS COST UPPER LIMIT THRESHOLD<br>NO ACCESS TIME THRESHOLD<br>REAL-TIME PERFORMANCE CONDITION | 1115 |
| CONDITIONS TO COMPRESS DATA IN TIER 3 | COMPRESSION METHOD: ZIP<br>PROCESS TIME UPPER LIMIT THRESHOLD<br>PROCESS COST UPPER LIMIT THRESHOLD<br>NO ACCESS TIME THRESHOLD<br>REAL-TIME PERFORMANCE CONDITION | 1116 |
| ... | ... | |

SETTING TABLE

COMPUTER SYSTEM AND METHOD FOR MANAGING DATA OF AN EXECUTED WORKFLOW

CLAIM OF PRIORITY

The present application claims priority from Japanese patent application JP 2019-217964 filed on Dec. 2, 2019, the content of which is hereby incorporated by reference into this application.

TECHNICAL FIELD

The present invention relates to a computer system.

BACKGROUND ART

A technique that assists business efficiency by management and control of data assets, referred to as data governance, has drawn increasing attention. In particular, in data analysis for performing a business judgment and the like, it is required to comprehend the lineage, such as where the used data was obtained from and which data was output.

However, intermediate data is recursively generated by each analysis, for example, by further analyzing data of a second generation obtained by analyzing original data to obtain data of a third generation. Therefore, an enormous volume of storage capacity is necessary for saving every pieces of intermediate data on the lineage, and a reduction of those pieces of intermediate data poses a problem.

Meanwhile, computer resources for performing data analysis processing include not only private resources referred to as, for example, a private cloud and an on-premise environment but also include, for example, computer resources published on a remote network referred to as a public cloud. Furthermore, for example, analytical processing service published on a network can also be used for a fee.

Use of them ensures temporarily securing a large amount of compute nodes to perform large-scale data processing. However, it is necessary to manage the intermediate data high in generation cost thus obtained so as not to be buried and lost in a large amount of miscellaneous pieces of intermediate data.

JP-A No. 2017-10376 uses a record of past access status to extract intermediate data that should be deleted according only to an impact to overall performance as a measure. Therefore, data that should not be deleted, such as the intermediate data that incurs an expensive generation cost and the intermediate data likely to fail to be regenerated necessitating a large amount of pieces of original data, is recommended. As a result, due to a human-caused errors by an administrator who determines deleting is possible or not, these pieces of intermediate data, which should not be deleted, are deleted.

SUMMARY

AI and big data analysis recursively generate new intermediate data by reusing intermediate data, for example, by generating second generation data specialized for each analysis purpose from first generation data (original data) stored in a storage and generating third generation data that has used the data. Therefore, these pieces of intermediate data are accumulated in the storage, and the storage capacity may be short since a capacity reduction technique, such as compression and deduplication, only is not enough.

A computer system includes one or more processors and one or more storage devices. The one or more storage devices store management information that manages a workflow and a deletion flag that indicates deletion of data in the workflow hidden from a user. The one or more processors execute a workflow that includes one or more processes that convert input data into output data, include information of a lineage of the executed workflow including information of the input data and the output data in the management information, delete data selected from data in the executed workflow, and set the deletion flag of the selected data in the management information, and, in response to an access to first data to which the deletion flag is set, regenerate the first data based on the management information and remove the deletion flag of the first data in the management information.

One aspect of the present invention ensures reducing stored data amount.

BRIEF DESCRIPTION OF DRAWINGS

FIG. 6A is a detailed block diagram of a workflow definition table stored in the memory of the data processing computer.

FIG. 6B is a detailed block diagram of a lineage table stored in the memory of the data processing computer.

FIG. 9 is a detailed block diagram of a storage configuration information table stored in the memory of the data processing computer.

FIG. 10 is a detailed block diagram of a billing information table stored in the memory of the data processing computer.

FIG. 11 is a detailed block diagram of a setting table stored in the memory of the data processing computer.

DESCRIPTION OF EMBODIMENTS

The following describes an embodiment of the disclosure by referring to the attached drawings. In the following description, while there are cases where a "program" is used as a subject to describe a process, the subject of the process may be a processor (or a device like a controller including the processor) since the program performs the determined process using, for example, a storage unit and/or an interface unit as necessary by being executed by the processor.

The program may be installed into a device like a computer from a program resource. The program resource may be, for example, a (for example, non-transitory) recording medium readable by a program distribution server or a computer. In the following description, two or more programs may be achieved as one program, or one program may be achieved as two or more programs.

In the following description, while there are cases where information that can obtain an output with respect to an input is described with an expression of, for example, an "xxx table," the information may be data in any structure. In the following description, configurations of the respective tables are one example, and one table may be divided into two or more tables or all or a part of two or more tables may be one table.

Figure 1:
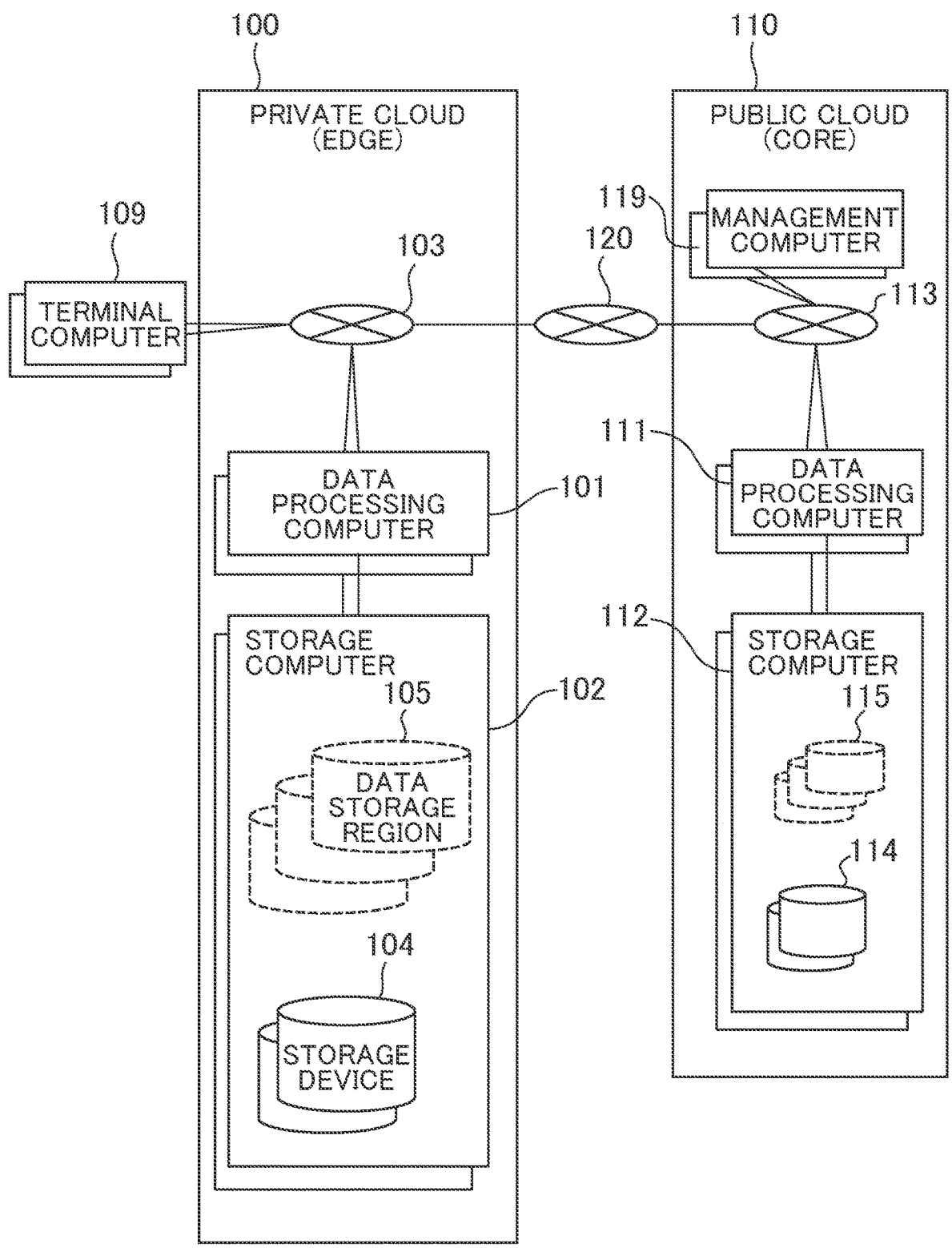
FIG. 1 is a drawing illustrating an exemplary overall configuration of a computer system of an embodiment.

FIG. 1 illustrates an exemplary overall configuration of a computer system of an embodiment. The computer system includes a private cloud 100 and a public cloud 110, and they are coupled by a wide area network 120. The private cloud includes one or more data processing computers 101 and one or more storage computers 102, and they are coupled by a local area network 103. The data processing computer 101 and the storage computer 102 are further coupled to one or more terminal computers 109 via the local area network 103.

The public cloud includes one or more data processing computers 111, one or more storage computers 112, and one or more management computers 119, and they are coupled by a local area network 113. The storage computers 102 and 112 include or externally coupled to respective one or more storage devices 104 and 114.

The storage computer 102 provides one or more data storage regions 105 for the data processing computer 101. The storage computer 112 provides one or more data storage regions 115 for the data processing computer 111. The data storage regions 105 and 115 are logic regions, achieved on the storage devices 104 and 114 as hardware, for finally storing data.

Note that, while one each of the private cloud and the public cloud are provided in FIG. 1, a plurality of the private clouds and the public clouds may be provided. The private cloud can be referred to as an on-premise environment internally including the terminal computer 109 as well. Alternatively, while the private cloud and the public cloud generally have different owners, they may have an identical owner. In that case, the private cloud may be referred to as an edge environment built at a position generally close to original data, and the public cloud may be referred to as a core environment that aggregates data of each edge environment.

While in FIG. 1, the storage computer and the data processing computer are separate, it may be configured that processes for data processing and for storage are operated on an identical computer. The computer in FIG. 1 may be a physical computer referred to as what is called a bare metal, may be a virtual computer referred to as a Virtual Machine (VM), or may be a virtual application execution environment referred to as a container.

Figure 2:
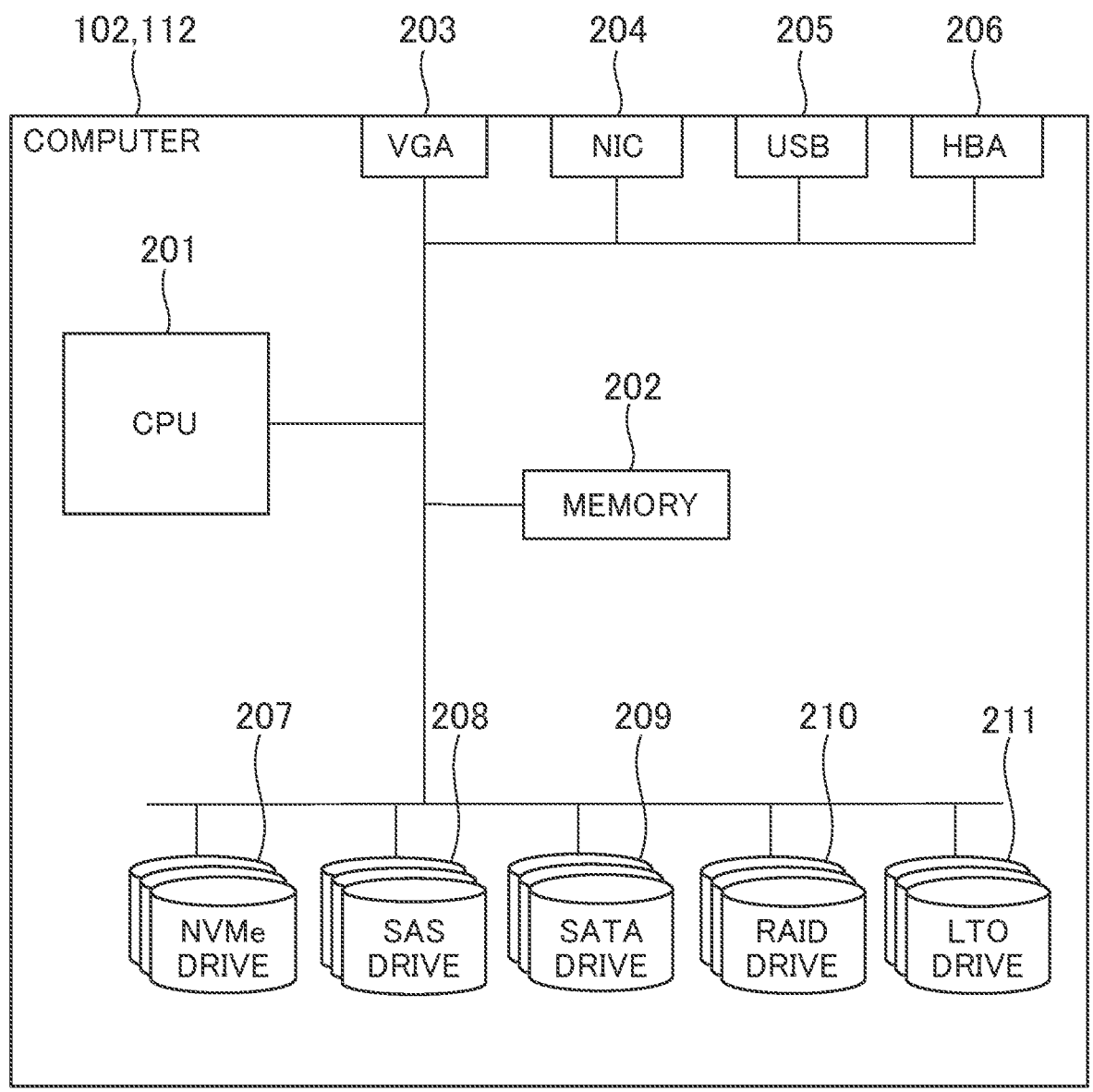
FIG. 2 is a hardware configuration diagram of a computer of the embodiment.

FIG. 2 illustrates a hardware configuration diagram of the storage computer of the embodiment. The data processing computer 101, the storage computer 102, and the terminal computer 109 installed in the private cloud, and the data processing computer 111, the storage computer 112, and the management computer 119 installed in the public cloud all have the same basic configuration.

Each computer includes a Central Processing Unit (CPU) 201 as a processor, a memory 202, a Video Graphics Array (VGA) 203, a Network Interface Card (NIC) 204, a Universal Serial Bus (USB) 205, and a Host Bus Adapter (HBA) 206. In particular, the HBA 206 is mainly included in the storage computer 102.

Each computer includes a storage device. Kinds of storage device include, for example, a Non-Volatile Memory express (NVMe) drive 207, a Serial Attached SCSI (SAS) drive 208, a Serial ATA (SATA) drive 209, a Redundant Arrays of Inexpensive Disks (RAID) drive 210, a Linear Tape Open (LTO) drive 211, and an external drive coupled by the HBA 203.

For example, the storage computer 102 includes a plurality of these storage devices, not only one of these storage devices. These components are coupled by an internal bus and an external bus. The computer may, for example, be coupled to a storage device in the public cloud 110 via the above-described NIC 204.

The RAID drive 210 is a storage device configured by bundling a plurality of hardware drives, such as the NVMe drive 207, the SAS drive 208, and the SATA drive 209. The plurality of drives may be bundled and used by a method other than the RAID, such as a Logical Volume Manager (LVM).

As described above, the computer system includes one or more processors (CPU) and one or more storage devices. A memory, a storage device, or a combination of them is a storage device including a non-transitory storage medium. Each processor can include a single or a plurality of arithmetic units or processing cores. The processor can be implemented as, for example, a central processing unit, a microprocessor, a microcomputer, a microcontroller, a digital signal processor, a state machine, a logic circuit, a graphic processing device, a chip on system, and/or any device that operates signals based on control instructions.

Figure 3:
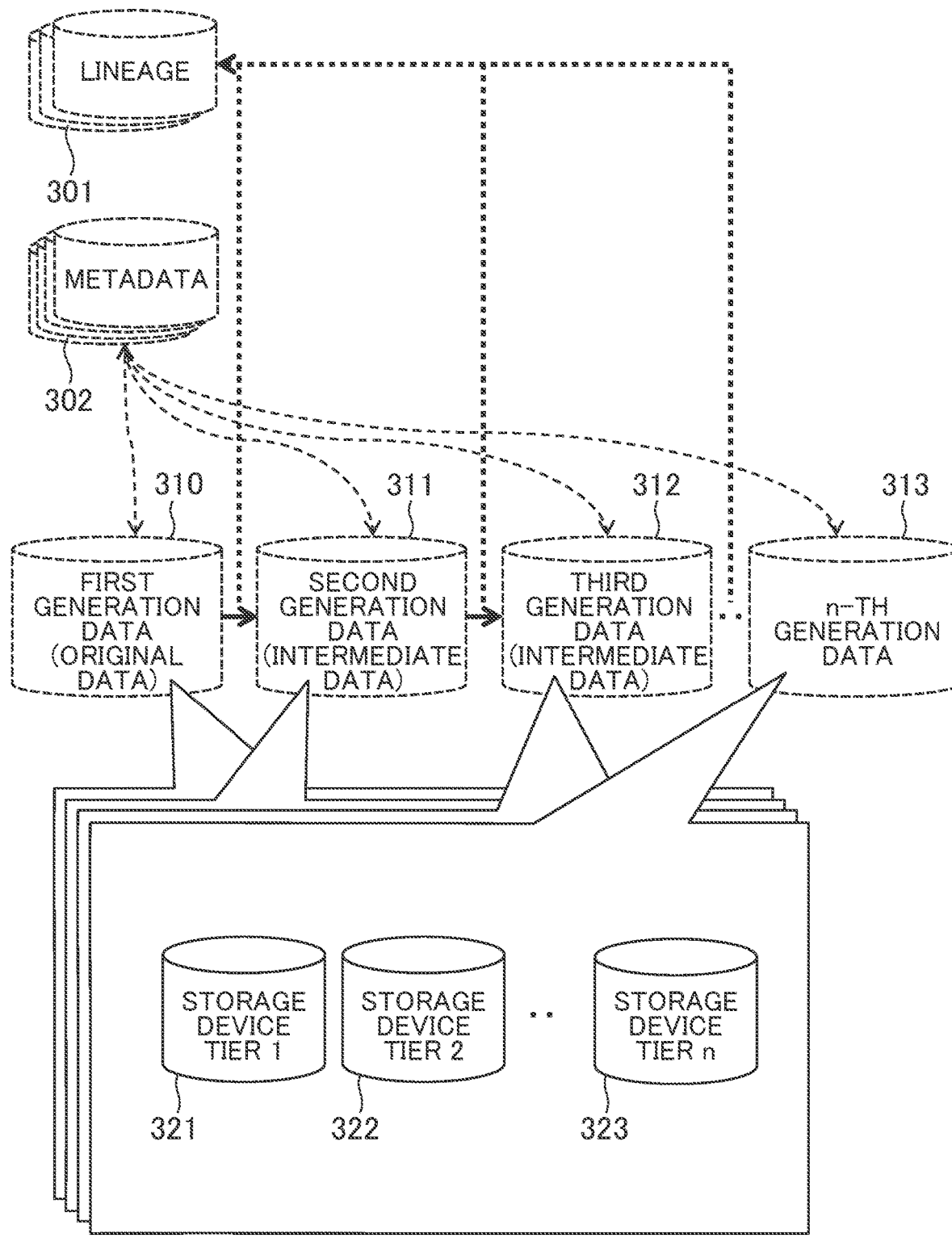
FIG. 3 is a logical block diagram illustrating a relation between a storage device of the embodiment and data storage region as a concept achieved on the storage device.

FIG. 3 illustrates a logical configuration of the storage devices 104 and 114 and the data storage regions 105 and 115 as a concept achieved on them. The storage devices have different tiers 321 to 323 and basically are each physically separated hardware. A mechanism of the tier is, for example, that two tiers of a tier configured by using a storage device with a high performance but small capacity and a tier configured by using a storage device with a low performance but large capacity are prepared and data storage destinations are distributed to different tiers in accordance with, for example, usage frequency of the data.

One or more data storage regions can be made on one storage device (tier) within a range where its physical capacity allows. The data storage region is mainly a logical region that can be achieved by existing software installed in the storage computer 102. Specifically, it can be achieved using various existing software, such as a file system, object storage software, an HTTP server, an FTP server, an SQL server, and a Non-SQL server. The existing software transforms a single data storage region on a storage device into a plurality of data storage regions with different names by the used existing software, such as a file, an object, and a record.

In the embodiment, the data stored in the data storage region includes several kinds of pieces of data, such as a lineage 301, metadata 302, and data 310 to 313 with different generations. The lineage 301 stores a "record of a creation of the next generation data by processing certain data."

Specifically, it is a record of former input data, latter output data, process that links these pieces of data, a result of the process, and setting values. Therefore, the lineage 301 is generated each time new data is output, and tracking this can identify which data is data that is an original of the certain data. The lineage is stored in a data storage region on a storage device specified as a storage destination of the lineage by, for example, a setting table 1100 described later.

The metadata 302 stores detailed attribute information of the data 310 to 313. Specifically, various information, such as which data storage region on which storage device the data is stored in, a storage destination of the lineage at the time of creation of the data, a data size, and a created date and time, is included. The metadata is stored in a data storage region on a storage device specified as the storage destination of the metadata by, for example, the setting table 1100 described later.

The data 310 to 313 of respective generations are generated by sequentially executing processes of some sort from the first generation data 310 as original data. The data of the first generation as the original data can be uploaded from, for example, the external terminal computer 109 via an interface like the NIC 204. Alternatively, by using data of the second generation or after as the original data for another process, the data is handled as data of the first generation in the other process.

It is also possible to generate a plurality of different pieces of second generation data by applying a plurality of different processes to the same first generation data and generate new data using a plurality of pieces of different generation data as input data. That is, the generations, such as the first generation and the second generation, are described for convenience of explanation, but the meaning is relative generations viewed from some sort of data, and when reference data as a view point changes, how to count the generations changes even with the identical data. Based on this, data existing between the first generation to n-th generation at the terminal is referred to as intermediate data.

The data 310 to 313 of the respective generations are basically stored in any one data storage region of the different tiers 321 to 323 in the above-described storage device. However, data having a high degree of importance like the original data that cannot be generated from other data may have a replication of the same data placed over different tiers, and the data that can be regenerated by referring to the lineage can have only the metadata and the lineage held and have no entity of data made on the storage device.

Figure 4:
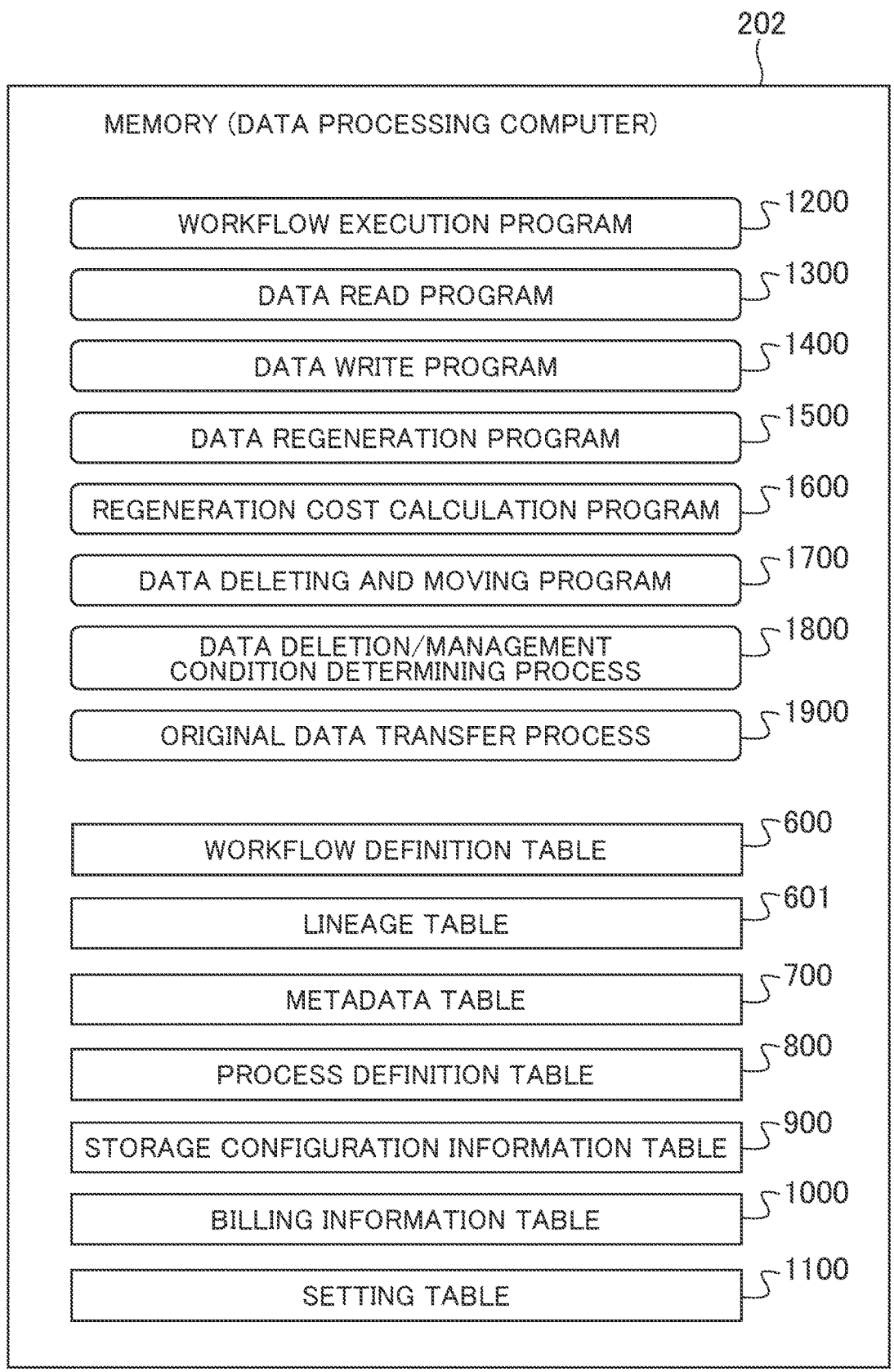
FIG. 4 is a block diagram of programs and tables stored in a memory of a data processing computer of the embodiment.

FIG. 4 illustrates a detailed configuration of programs and management information stored in the memory 202 of the data processing computer of the embodiment. The memory 202 stores programs, such as a workflow execution program 1200, a data read program 1300, a data write program 1400, a data regeneration program 1500, a regeneration cost computing program 1600, and a data deleting and moving program 1700. Also, a data deletion/management condition determining process 1800, an original data transfer process 1900, and the like of subroutines used in those programs are stored.

Furthermore, the memory 202 stores the management information for managing a workflow. The details of the workflow will be described later. The management information can include, for example, tables, such as a workflow definition table 600, a lineage table 601, a metadata table 700, a process definition table 800, a storage configuration information table 900, a billing information table 1000, and the setting table 1100. Furthermore, programs and tables including, for example, Operating System (OS), file system, and various kinds of applications for achieving other services are stored.

Figure 5:
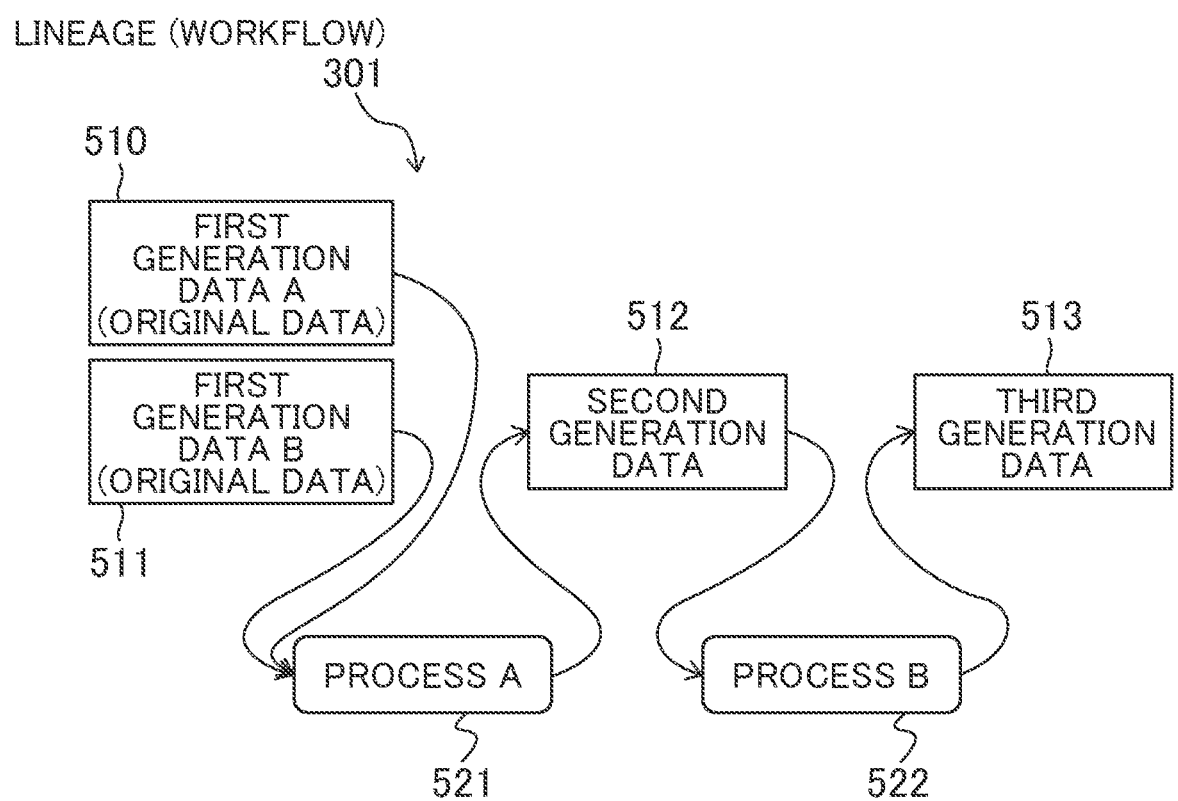
FIG. 5 is a conceptual diagram of a lineage (workflow) stored in the memory of the data processing computer.

FIG. 5 illustrates a conceptual diagram of the lineage 301. The lineage 301 includes, in addition to information that defines a process flow referred to as a "workflow," information of execution result obtained by actually executing it. For example, using two pieces of first generation data 510 and 520 as inputs, a process A 521 generates second generation data 512.

Furthermore, using the above-described second generation data 512 as an input, a process B 522 outputs third generation data 513. The definition of such a process flow is the "workflow."

The "lineage" includes information, such as a period that took for the process and success or failure of the process of the process A 521 and the process B 522 obtained by executing this "workflow." Specifically, the "workflow" is defined by the workflow definition table 600 described later. The "lineage" is defined by the lineage table 601 described later. The "process" in the workflow is defined by the process definition table 800 and a process definition 802 in the table described later.

Note that, for the "process" in the workflow, a "process with reproducibility" that outputs exactly the same for the same input data and a "process with no reproducibility" that has a different result for each process are conceivable. For example, in order to regenerate already deleted intermediate data by executing the "process" again, the process must be the "process with reproducibility."

Meanwhile, the "process with no reproducibility" includes not only the process that simply has a changed result every time but a loop, a conditional branch, and the like in the workflow are also a kind of the "process with no reproducibility" in that "the next process is not constant." However, for example, a fixed number of loops become the "process with reproducibility" by a transformation that arranges the number of processes as same as the repeated number of the loop in series by a method referred to as, for example, loop unrolling.

When a section of which outputs are consequently constant for the same inputs is cut out as a subflow, even though there is a "process with no reproducibility" including a conditional branch or a loop in the subflow, it can be handled as a "process with reproducibility" as a whole. In the embodiment, the workflow definition input from, for example, the terminal computer is assumed to be equivalently transformed in advance to be a collection of "processes with reproducibility" as far as possible by a method such as the loop unrolling and coding as subflow as described above.

Next, an environment where the "process" defined by the process definition 802 described above is executed will be complemented. Application software that actually performs the "process" is executed on one or more execution environments. The execution environment is not only a physical calculator referred to as a bare metal, but may be a virtual computer referred to as a Virtual Machine (VM) or may be a virtual application execution environment referred to as a container.

When the VM or the container is used, the execution environment can move between the different computers without newly developing special software. For example, the process that can be executed on the data processing computer 101 on the private cloud 100 can be executed on the data processing computer 111 on the public cloud 110 too. Accordingly, in case where series of data regarding the process as indicated by the above-described lineage 301 is moved between the different computers, the process can be performed in a movement destination.

For example, when data on the storage computer 102 that exists in the private cloud 100 is moved onto the storage computer 112 that exists in the public cloud 110, the data can be processed on the one or more data processing computers 111 that exist in the public cloud 110. Not only moving the whole workflow to the public cloud, it is also possible to execute only a part of processes of the workflow in the public cloud and receive the process result to continuously execute the rest of the workflow in the private cloud.

FIG. 6A illustrates the workflow definition table 600. Items in columns of the workflow definition table 600 include a flow number 611, a process name 612, input data 613, output data 614, a link 615, a flow setting 616, and a reference counter 617. The flow number 611 is an identifier to identify a workflow. The process name 612 is an identifier to identify a process used in one step in the above-described workflow.

The input data 613 is an identifier to identify data used as input data in one step in the above-described workflow. A plurality of pieces of the input data may exist. The output data 614 is an identifier to identify data output in one step in the above-described workflow. A plurality of pieces of the output data may exist.

The link 615 is an identifier to identify one step in the above-described workflow. An identifier of a step in a previous stage and an identifier of a step in a latter stage of itself together with its own identifier are held. Note that, in the case of a step at the beginning of the workflow, the link to the previous stage is "none." Alternatively, in the case of a step at the end of the workflow, the link to the latter stage is "none."

The flow setting 616 stores, for example, settings at the time of executing the process specified by the process name 612. This ensures executing the process specified by the process name 612 with the same setting every time and executing the same process with different settings in a plurality of workflows. The reference counter 617 is a counter to indicate the number of use of the workflow.

For example, when one of the pieces of intermediate data is deleted, the reference counter of the process for regenerating the intermediate data is increased by one in the workflow. Incrementing the reference counter reserves the workflow to be used in the regeneration of the data. Deletion of (information of) the reserved workflow having the reference counter of other than zero is inhibited. This prevents the workflow necessary for regenerating the intermediate data from being deleted.

Items in rows of the workflow definition table 600 are examples corresponding to the conceptual diagram of the lineage 301 illustrated in FIG. 5. A row 620 indicates that, in the "process A" of the workflow identified by a workflow number "W001," two pieces of the first generation data are read as input data, and one piece of the second generation data is output. This "process A" can be identified by "L001" indicated in the link 615, and it is indicated that it is a step at the beginning with no previous stage and the process at the latter stage is "L002." The value of the reference counter 617 is 1 to indicate that there exists one piece of data that needs to be data-regenerated using this step (process).

A row 621 indicates that, in the "process B" of the workflow identified by a workflow number "W001," one piece of the second generation data is read as input data, and one piece of the third generation data is output. This "process B" can be identified by "L002" indicated in the link 615, it is indicated that the previous stage is the step of "L001," and it is the end with no process at the latter stage.

Furthermore, the flow setting 616 indicates that, for the execution conditions of the "process B," the execution location is the public cloud (Public), the kind of computer to be used is "A," and the process is executed using "8" nodes. For the flow setting 616, various parameters at the time of execution can be described, not limited to the above-described settings. This ensures, for example, customizing a content of the process from a default setting and adding operational options.

FIG. 6B illustrates a detailed configuration of the lineage table 601. Items in columns of the lineage table 601 include a lineage number 631, a workflow number 632, a link number 633, an execution time 634, an output data storage destination 635, and a process result 636.

The lineage number 631 is an identifier to identify the lineage. The workflow number 632 stores the flow number 611 of the workflow corresponding to the lineage. The link number 633 stores an identifier of the link 615 in the workflow corresponding to the lineage. The execution time 634 records a time when one step in the workflow corresponding to the lineage was executed. Specifically, an execution starting time and an execution finishing time are recorded together with time difference information. Furthermore, when, for example, the time when the process was executed and the time when the output data was written out can be distinguished within the range, their respective details can be recorded.

The output data storage destination 635 stores an identifier that identifies a storage destination of the output data generated when one step in the workflow corresponding to the lineage was executed. This corresponds to a data storage region identifier 901 in the storage configuration information table 900 described later. The process result 636 stores information regarding the execution result of one step in the workflow corresponding to the lineage.

Items in rows of the lineage table 601 are examples corresponding to the above-described workflow definition table 600. A row 640 indicates that the lineage of a lineage number "P001" is an execution result of a step identified by the link identifier of "L001" in the workflow identified by the flow number "W001." It is indicated that the process result 636 was successful together with the execution time 634 and the output data storage destination 635, and a time (t1) and a cost (c1) that took for the process are indicated.

A row 641 indicates that the lineage of the lineage number "P001" is the execution result of the step that can be identified by the link identifier of "L002" of the workflow identified by the flow number "W001." It is indicated that the process result 636 was successful together with the execution time 634 and the output data storage destination 635, and a time (t2) and a cost (c2) that took for the process are indicated.

Figure 7:
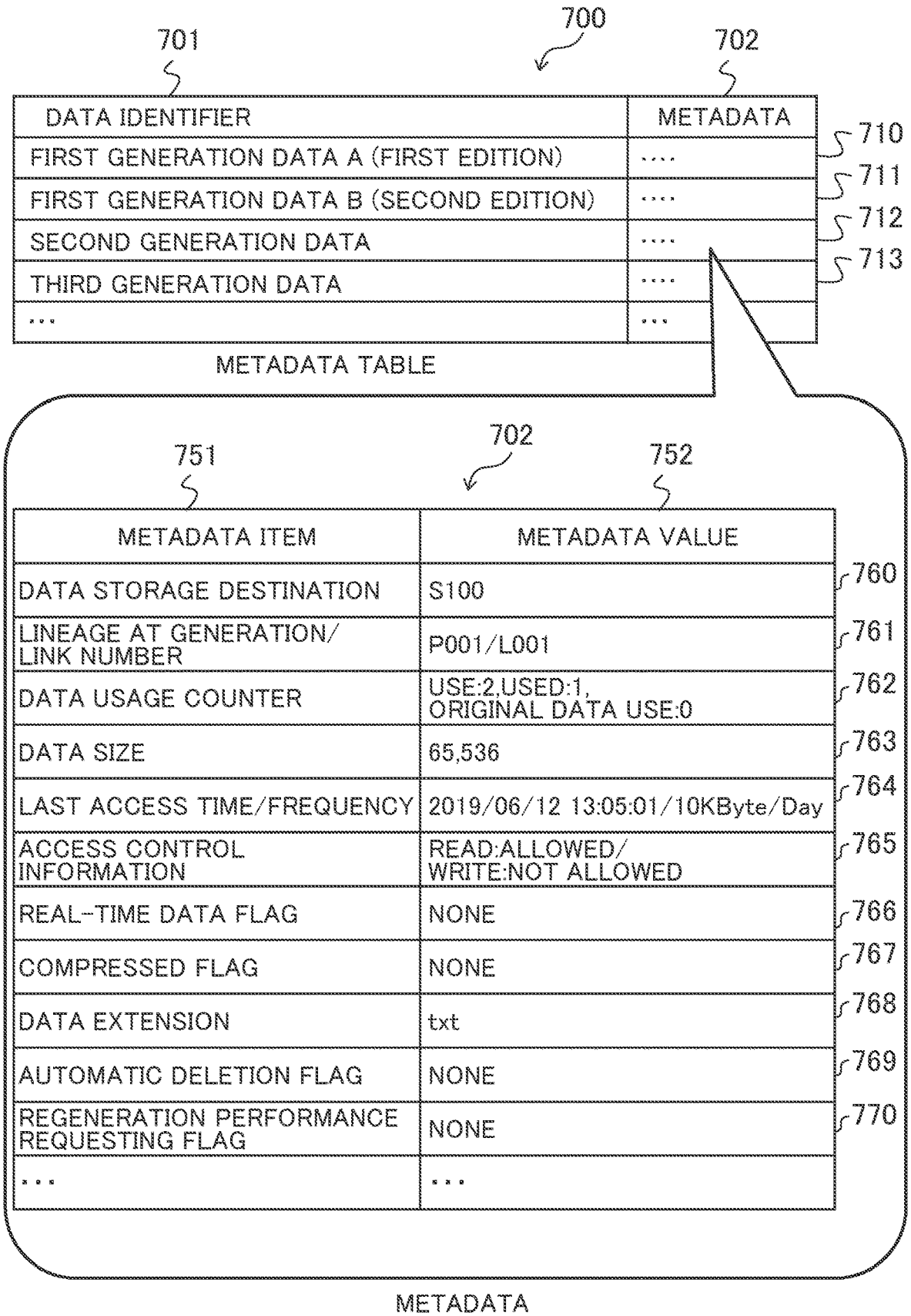
FIG. 7 is a detailed block diagram of a metadata table and metadata stored in the memory of the data processing computer.

FIG. 7 illustrates the metadata table 700 and a detailed configuration of metadata 702 in the table. Items in columns of the metadata table 700 include a data identifier 701 and the metadata 702.

The data identifier 701 is an identifier that identifies data corresponding to the metadata 702 to associate it to the metadata 702. The metadata 702 is a table that stores additional information of "data identified by the data identifier 701."

Items in columns of the metadata 702 include a metadata item 751 and a metadata value 752. The metadata item 751 stores an identifier that identifies one of pieces of additional information of the data. The metadata value 752 stores a value of the "additional information of the data identified by the metadata item 751."

A row 760 is an example of the "data storage destination" as one of pieces of the metadata. The data storage destination 760 indicates a location of the data corresponding to the metadata by holding the data storage region identifier 901 in the storage configuration information table 900 described later. The storage destination of the data may be on a remote storage device, and can be described using a format, such as a Uniform Resource Identifier (URI).

Note that, when, for example, a plurality of data entities exist for a single piece of metadata, the data storage destination can hold a plurality of the data storage region identifiers 901. When the entity of the data is automatically deleted, the data storage region identifier 901 of the deleted data is also deleted as Step S1707 of the data deleting and moving program 1700 described later.

A row 761 is an example of a "lineage at generation/link number" as one of the pieces of metadata. The lineage at generation/link number holds the lineage number 631 and the link number 633 of the lineage recorded when the entity of the data corresponding to the metadata was generated. This ensures identifying the process necessary for regenerating the deleted data by tracking the lineage even though the entity of the data is deleted.

A row 762 is an example of a "data utilization counter" as one of the pieces of metadata. The data utilization counter includes three reference counters of the number of use, the number of used, and the number of original data use.

Specifically, the number of use is the number of pieces of data necessary for generating the data on the workflow. The number of used is the number of pieces of the data used for generating other data. The number of original data use is a kind of the number of used, and is the number of pieces of the data used as the lead of a chain to recursively generate data from data, such as the data is used as an input at the beginning of the workflow.

Holding all the data corresponding to the original data use eliminates the necessity for regenerating data in multiple stages over a plurality of workflows, such as "since there exists no input data at the start of the workflow, it is regenerated in another workflow." Note that values of these number of use, number of used, and number of original data use are updated in association with addition of new workflows and deletion of the existing workflows. Specifically, they are updated at Step S1202 of the workflow execution program 1200 described later.

A row 763 is an example of a "data size" as one of the pieces of metadata. The data size is updated when the data is written, and the size of the data is indicated in a unit of byte. Deleting data having a larger data size can obtain a larger data capacity reduction effect.

A row 764 is an example of a "last access time/frequency" as one of the pieces of metadata. The last access time/frequency is values updated every time an access occurs to the data, and indicates the time the data was last accessed and the access frequency. Referring to these values ensures, for example, extracting data that has not been used for a predetermined period.

Note that, generally, for example, three times referred to as a birth time, a modify time, and an access time, and the number of access are recorded by an OS. The birth time, the modify time, and the access time mean a "time at which data was first generated," a "time at which change was last made," and a "time at which access was last made," respectively. Referring to them also obtains the values of the above-described "last access time/frequency."

A row 765 is an example of "access control information" as one of the pieces of metadata. The access control information indicates whether reading and writing of data is allowed or not. In the embodiment, the setting relating to writing is particularly referred to. For example, in order to regenerate the deleted data, it is necessary that the content of the input data used at the time of regeneration is held without being changed.

The fact that the writing onto the input data is inhibited ensures confirming that the content of the input data is not changed. Note that, besides this, it is possible to confirm that the input data is not changed by referring to tier information 902 of the storage configuration information table 900 to confirm whether the tier performs version management that holds all the versions of the data.

A row 766 is an example of a "real-time data flag" as one of the pieces of metadata. The real-time data flag indicates that it is data that needs to secure certain responsivity and bandwidth at the time of input and output, such as video data and voice data. When such data is stored, for example, in a remote storage device via the wide area network 120, there is a possibility that an influence of network delay and congestion cannot be allowed. Therefore, it can be removed from a target of remote data rearrangement in accordance with the setting table 1100.

A row 767 is an example of a "compressed flag" as one of the pieces of metadata. The compressed flag indicates that the data is compressed data. This ensures identifying the compressed data, preventing recompression, and the like.

A row 768 is an example of a "data extension" as one of the pieces of metadata. The data extension is an identifier to distinguish a kind of data. Referring to this extension also ensures determining a property of data, such as real-time performance and compressed or not compressed as described above. For example, it can be determined by comparing character strings, such as it is "data compressed in ZIP format" when the extension is ".zip."

A row 769 is an example of an "automatic deletion flag" as one of the pieces of metadata. The automatic deletion flag is a flag indicating that the entity of the data corresponding to the metadata was automatically deleted while being hidden from a user, and is set at Step S1706 of the data deleting and moving program 1700 described later and is deleted when the data is regenerated. This ensures automatically regenerating the data when there is an access to the automatically deleted data.

A row 770 is an example of a "regeneration requesting flag" as one of the pieces of metadata. The regeneration requesting flag is added to request the regeneration of the data from Step S1303 to Step S1304 of the data read program 1300. For example, a mechanism that periodically executes a program referred to as, for example, existing cron daemon or crontab command periodically checks whether there is data added with the regeneration requesting flag. When the regeneration requesting flag is found, the data can be regenerated by executing the data regeneration program 1500 described later. Note that, in case the data is regenerated, the regeneration requesting flag is deleted.

Figure 8:
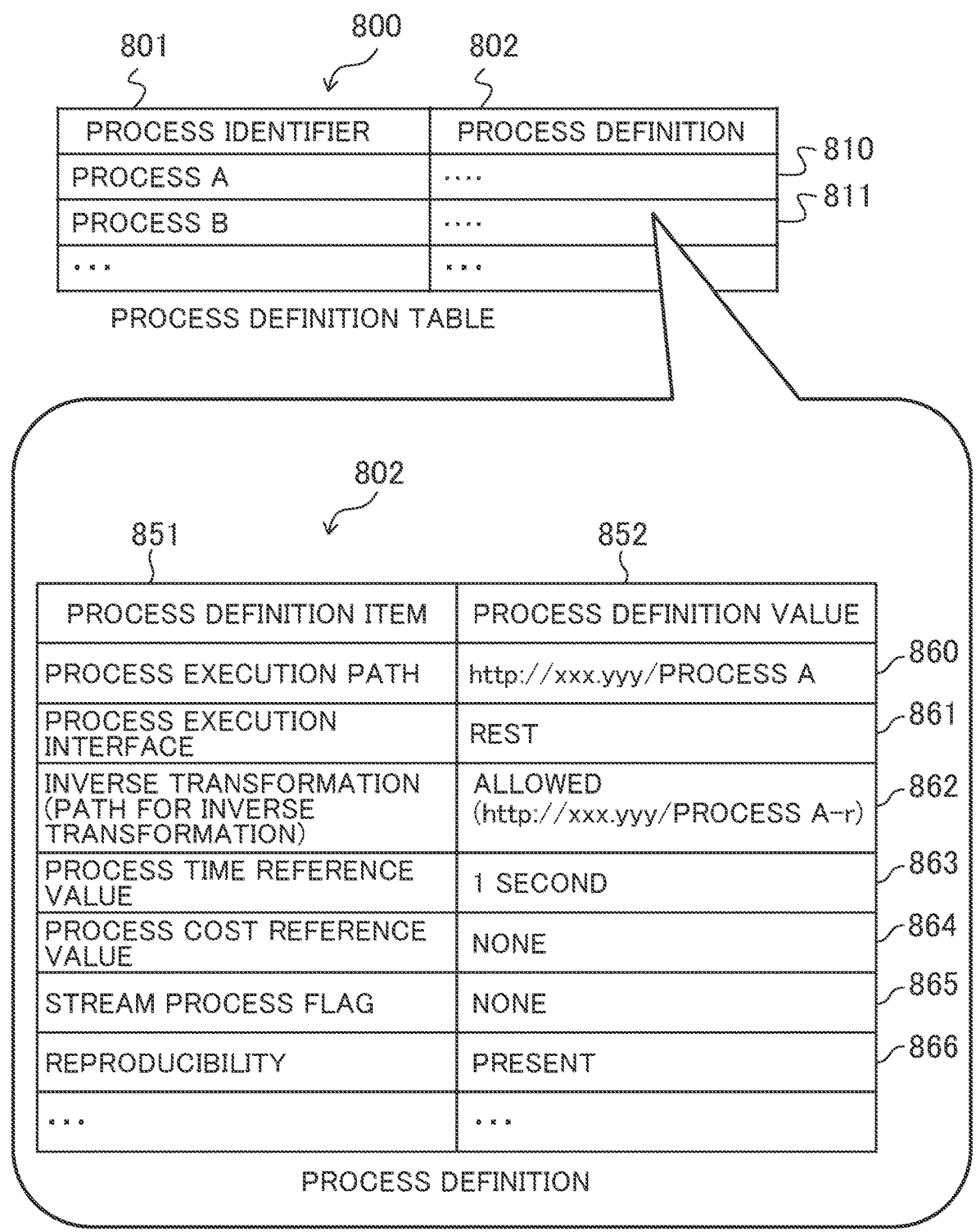
FIG. 8 is a detailed block diagram of a process definition table and process definitions stored in the memory of the data processing computer.

FIG. 8 illustrates the process definition table 800 and a detailed configuration of the process definition 802 in the table. Items in columns of the process definition table 800 include a process identifier 801 and the process definition 802. The process identifier 801 is an identifier that identifies a process corresponding to the process definition 802 and associates it with the process definition 802. The process definition 802 is a table that stores information regarding a "process identified by the process identifier 801."

Items in columns of the process definition 802 include a process definition item 851 and a process definition value 852. The process definition item 851 stores an identifier that identifies one of pieces of information regarding the process. The process definition value 852 stores a value of "information regarding the process identified by the process definition item 851."

A row 860 is an example of a "process execution path" as one of the process definitions. The path ensures identifying an access point to an execution file or a service for executing the process. A row 861 is an example of a "process execution interface" as one of the process definitions. Referring to this value ensures identifying a kind of the process that can be identified in the process execution path. Specifically, a procedure to provide input data and a procedure to obtain output data can be identified. Furthermore, it is also possible to identify whether it is a process on the private cloud or a service on the public cloud.

A row 862 is an example of an "inverse transformation (path for inverse transformation)" as one of the process definitions. The process to which this is set indicates that there is an inverse transformation that has inverse input and output. For example, compression and decompression of data is the inverse transformation of one another. The path ensures identifying an access point to an execution file and a service for executing an inverse transform process.

A row 863 is an example of a "process time reference value" as one of the process definitions. Every time the process is executed, the time that actually took for the process is recorded in the lineage, and the row 863 can hold statistics, such as an average value, a minimum value, and a maximum value of these values, as a process time reference value. The row 863 can store an initial value of the process time that serves as a guide when the process has never been executed yet and there is no lineage.

A row 864 is an example of a "process cost reference value" as one of the process definitions. The row 864 stores, for example, information of the cost like a license fee and a service fee that occurs every time the process is executed. Referring to this value can compute the process cost with, for example, the regeneration cost computing program 1600 described later. The row 864 can also describe a calculation formula of the cost, not only directly describing the amount of money.

Specifically, referring to the billing information table 1000 described later shows values of, for example, a usage fee of the computer, and referring to the flow setting 616 of the workflow definition table 600 shows the settings, such as how many computers are used in the setting to execute the process. For example, describing the calculation formula, such as "usage fee of one computer"×"used number"× "process time," ensures computing a process cost corresponding to the setting at the time of process execution and time that took for the process.

A row 865 is an example of a "stream process flag" as one of the process definitions. The process with this flag indicates that a stream process, such as sequentially writing out output data while reading input data, is performed.

A row 866 is an example of "reproducibility" as one of the process definitions. The reproducibility indicates that the process always generates the same output data for the same input data. The row 866 can describe that the possibility of losing the reproducibility is not zero for the process that has a possibility of change in the service content and stop of the service, such as a service on the public cloud.

FIG. 9 illustrates a detailed configuration of the storage configuration information table 900. The storage configuration information table 900 defines three relationships between the storage device, the tier, and the data storage region. The content of the storage configuration information table 900 can be set from the terminal computer 109 and directly obtained from the storage computer 102/112. Items in rows of the storage configuration information table 900 include the data storage region identifier 901, the tier information 902, and storage device information 903.

The data storage region identifier 901 is an identifier that identifies a data storage region. This identifier has a preliminarily determined value in one case and has no determined value in the other case. Specifically, for example, when a database or the like is used as software for achieving a data storage region, the value is preliminarily determined in a form of a table name or a field name. Meanwhile, when software like a file system is used, a value is determined as a file name at a timing where the data is newly written.

The tier information 902 stores detailed information of the tier achieved by the storage device. Specifically, an identifier that identifies the tier, one or more protocols that can be used to access data of this tier, and Read performance information and Write performance information, such as a bandwidth and a responsivity, are stored. The storage device information 903 stores information, such as an identifier that identifies the hardware, a capacity, and a kind of device.

An example of a row 910 indicates that a "tier 1" having data storage regions from S1 to S9999 that can be distinguished by the data storage region identifier 901 is achieved on the storage device having a capacity of 1 T byte that can be identified by an identifier "DEV01." The "tier 1" can be accessed in REpresentational State Transfer (REST) protocol, and has the version management function, and therefore, it is indicated that all the versions of each piece of data are held. Furthermore, there is indicated detailed specifications, such as input and output performances of the tier and the kind of the storage device being RAID6 that uses NVMe.

An example of a row 911 indicates that a "tier 2" having data storage regions from S10000 to S39999 that can be distinguished by the data storage region identifier 901 is achieved on a storage device having a capacity of 100 T byte that can be identified by an identifier "DEV02." The "tier 2"

can be accessed in Network File System (NFS) protocol, and has the version management function, and therefore, it is indicated that all the versions of each piece of data are held. Furthermore, there is indicated detailed specifications, such as input and output performances of the tier and the kind of the storage device being Just a Bunch Of Disks (JBOD) using SATA on a remote public cloud.

FIG. 10 illustrates a detailed configuration of the billing information table 1000. Items in columns of the billing information table 1000 include a billing item 1001 and money amount information 1002. A content of the billing information table can be input from the terminal computer 109 and can be obtained as information published on the management computer 119 of the public cloud 110. A plurality of the billing information tables 1000 having different fee structures can be held per environment, such as the private cloud and the public cloud.

A row 1010 is an example of a usage fee of a data processing computer as one of pieces of billing information and indicates one node usage fee per hour. A row 1011 is also an example of a usage fee of a data processing computer as one of the pieces of billing information and indicates one node usage fee per hour of a computer having a different specification from the one described in the row 1010.

A row 1012 is an example of a usage fee of a storage device and indicates a monthly usage fee per 1 G byte of data capacity. A row 1013 is an example of a fee for data uploading and indicates a data transfer fee per 1 G byte. A row 1014 is an example of a fee for data transfer in cloud and indicates a data transfer fee per 1 G byte.

A row 1015 is an example of a fee for data downloading and indicates a data transfer fee per 1 G byte. A row 1016 is an example of a usage fee for Operating System (OS) and indicates a license fee per hour. A row 1017 is an example of a usage fee of computing process service and indicates a fee per process.

FIG. 11 illustrates a detailed configuration of the setting table 1100. Items in columns of the setting table 1100 include a setting item 1101 and a set value 1102. A row 1110 indicates a data deletion and a target value of management. For example, the data capacity may be specified in proportion like 90%, or it may be specified by an absolute value, such as a free space target or a reduced target of 10 TB. Besides, the target value may be described in various notation systems.

A row 1111 also indicates a data deletion and a target value of management similarly to the row 1110. While the row 1110 is the target value for the "tier 1" that can be identified by the tier information 902 of the storage configuration information table 900, the row 1111 is the target value for the "tier 2." Thus, different target values can be set for each tier. This can also omit writing onto the "tier 2" as the movement destination, for example, when the data that satisfies a data rearrangement reference to the tier 2 in the "tier 1" satisfies a data deletion reference in the "tier 2" as the movement destination.

A row 1112 indicates a priority order of write destination tiers. When there are empty spaces in the capacities of the write destination tiers, data is written onto the tier with the higher priority order. A row 1113 is an example of conditions to delete the data in the tiers 1 to 3. It is not limited to this, and different conditions of data deletion may be set for each tier.

A row 1114 is an example of conditions to rearrange the data from the tier 1 to the tier 2. It is not limited to this, and various conditions of data move between tiers may be set. A row 1115 is an example of conditions to rearrange the data from the tier 2 to the tier 3. Together with the setting of the row 1114, it is possible to, for example, sequentially move the data with reduced frequency of use from the tier 1 to the tier 2, and to the tier 3. A row 1116 is an example of conditions to compress the data in the tier 3. It is not limited to this, and the conditions of data compression may be set for various tiers. The settings of the conditions are not limited to the above-described examples, and conditions for complete deletion including metadata may be described and conditions to simultaneously perform compression and movement may be described.

Note that the conditions described from the row 1113 to the row 1116 are used in a determination in the data deletion/management condition determining process 1800 described later. As described in various parts herein, while there are various setting items other than what are described above, initial setting values additionally and preliminarily determined are applied when there specifically is no description in the setting table 1100. Besides, there are three tiers in the above-described example, any number of tiers may be set corresponding to the contents described in the storage configuration information table 900 and the like or a plurality of tiers with the same level may be set.

Figure 12:
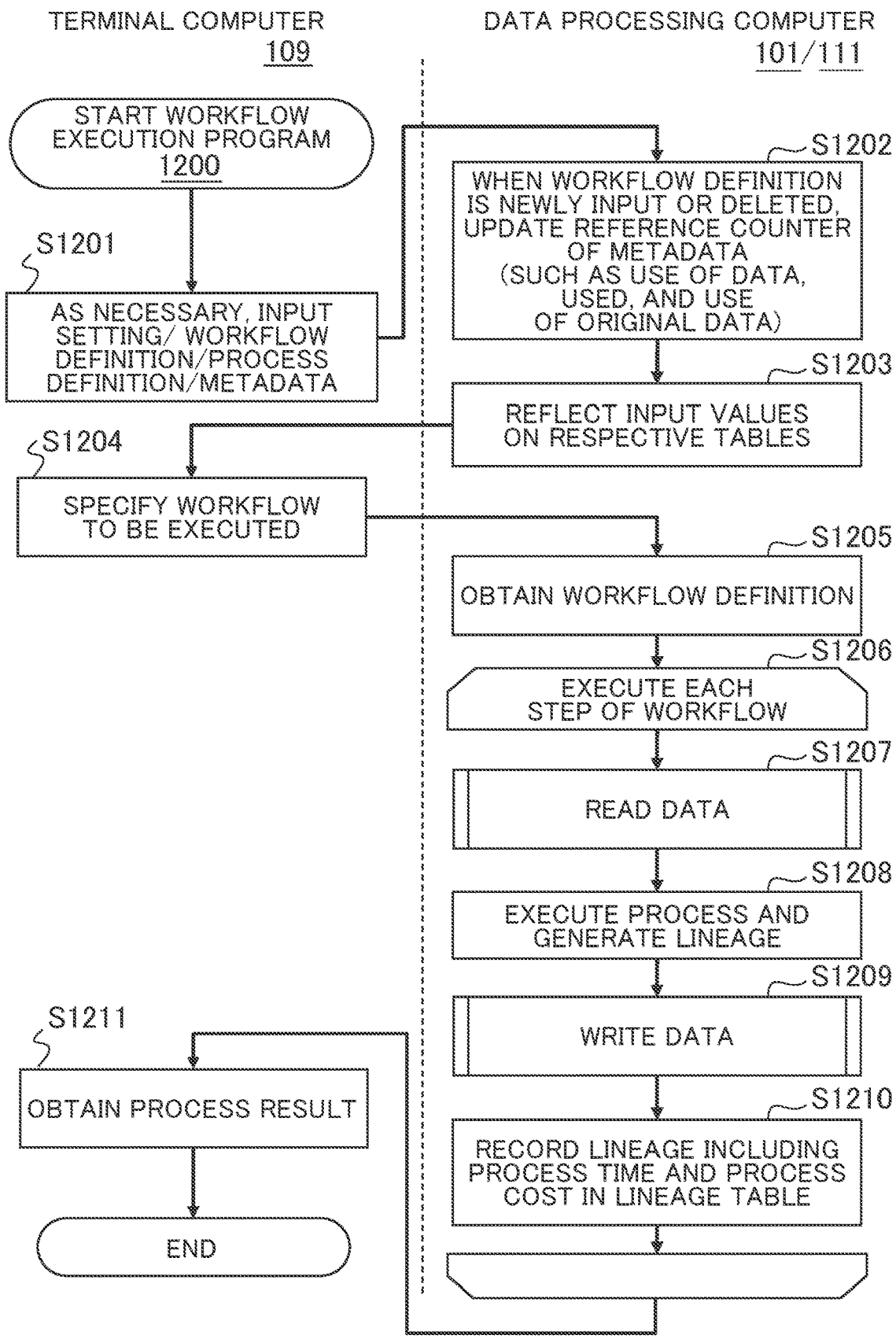
FIG. 12 is a drawing illustrating a flow of a process of a workflow execution program stored in the memory of the data processing computer.

FIG. 12 illustrates a flow of a process of the workflow execution program 1200 executed by the data processing computer by an operation of the terminal computer 109. The workflow execution program 1200 starts at the timing of the operation on the terminal computer 109 (S1200).

A user newly inputs various kinds of definition tables, such as the workflow definition table 600, the metadata table 700, the process definition table 800, the storage configuration information table 900, the billing information table 1000, and the setting table 1100, and inputs an update content as necessary from the terminal computer 109. At this time, the billing information table 1000 may be obtained from, for example, the billing information of the public cloud published by the management computer 119 of the public cloud 110 and a usage fee calculation simulation screen. A part or all of the storage configuration information table 900 may be obtained from the storage computer (S1201). The input content is transmitted to the data processing computer 101/111.

The workflow execution program 1200 updates the reference counter (such as use of data, used, and use of original data) of the metadata when the workflow definition is newly input or deleted (S1202).

In the case where a new workflow is added to the workflow definition table 600, the workflow execution program 1200 updates, for data used in the new workflow, the data utilization counter 762 of the metadata 702 corresponding to the data.

Specifically, the workflow execution program 1200 increases the number of used of the data utilization counter 762 by the number of used for the data used in the input in the new workflow. The workflow execution program 1200 increases the number of use of the data utilization counter 762 by the number of data necessary for outputting the data for the data output by the new workflow. Furthermore, when the data is used as the original data in the new workflow, the workflow execution program 1200 increases the number of original data use of the data utilization counter 762 by the number used as the original data.

Meanwhile, in the case where the existing workflow is deleted, the workflow execution program 1200 confirms the reference counter 617 of the workflow definition table 600. When the value of the counter is not zero, it is necessary for regenerate the deleted data, and therefore, the workflow execution program 1200 inhibits the deletion of the workflow. The workflow execution program 1200 rejects the deletion of the workflow and notifies the terminal computer 109 of the error.

In the case where the workflow is forcibly deleted, the workflow execution program 1200 regenerates all the deleted data that can be regenerated in the workflow to be deleted by confirming all the metadata on the metadata table 700, makes the value of the reference counter 617 zero, and executes the deletion of the workflow.

Note that, the "process" used in the workflow can also be coordinated with addition and deletion of the workflow by causing each "process" to have the reference counter similar to the above. Specifically, in the case of inhibiting the deletion of the "process" used in the workflow and the forcible deletion, the deleted data that has used the "process" before the deletion can be regenerated.

It is not limited to the above, and in the case where checks of the update content, such as the data formats of the input contents correspond or not, has been passed, the workflow execution program 1200 reflects the input content on each table held by the data processing computer 101/111 (S1203).

Next, the user specifies a workflow to be executed from the terminal computer 109. At this time, it is possible to perform various specifications, such as a specification of a plurality of workflows and a periodic, repeated, and automatic execution (S1204). The specified content is transmitted to the data processing computer 101/111. The workflow execution program 1200 reads the specified workflow from the workflow definition table 600 (S1205).

The workflow execution program 1200 sequentially executes each step of the read workflow (S1206). Specifically, the workflow execution program 1200 reads the data specified by the input data 613 (S1207), and executes the process specified by the process name 612 with the setting specified by the flow setting 616. The workflow execution program 1200 calculates and holds the information, such as a "time that took for process (process time)" and a "cost that took for process (process cost)," necessary for creating the process result 636 of the lineage using the process definition 802 and the like (S1208).

The workflow execution program 1200 writes out data specified by the output data 614 as the execution result (S1209). The time that took to write out the data can also be added to the "time that took for process" in the process result 636. The workflow execution program 1200 adds success or failure of the final process in the process result 636 of the lineage to record the information 631 to 636, such as the execution time 634 and the output data storage destination 635, in the lineage table 601 (S1210). The process result of the workflow can be confirmed by, for example, referring this lineage table 601 from the terminal computer 109 (S1211).

Figure 13:
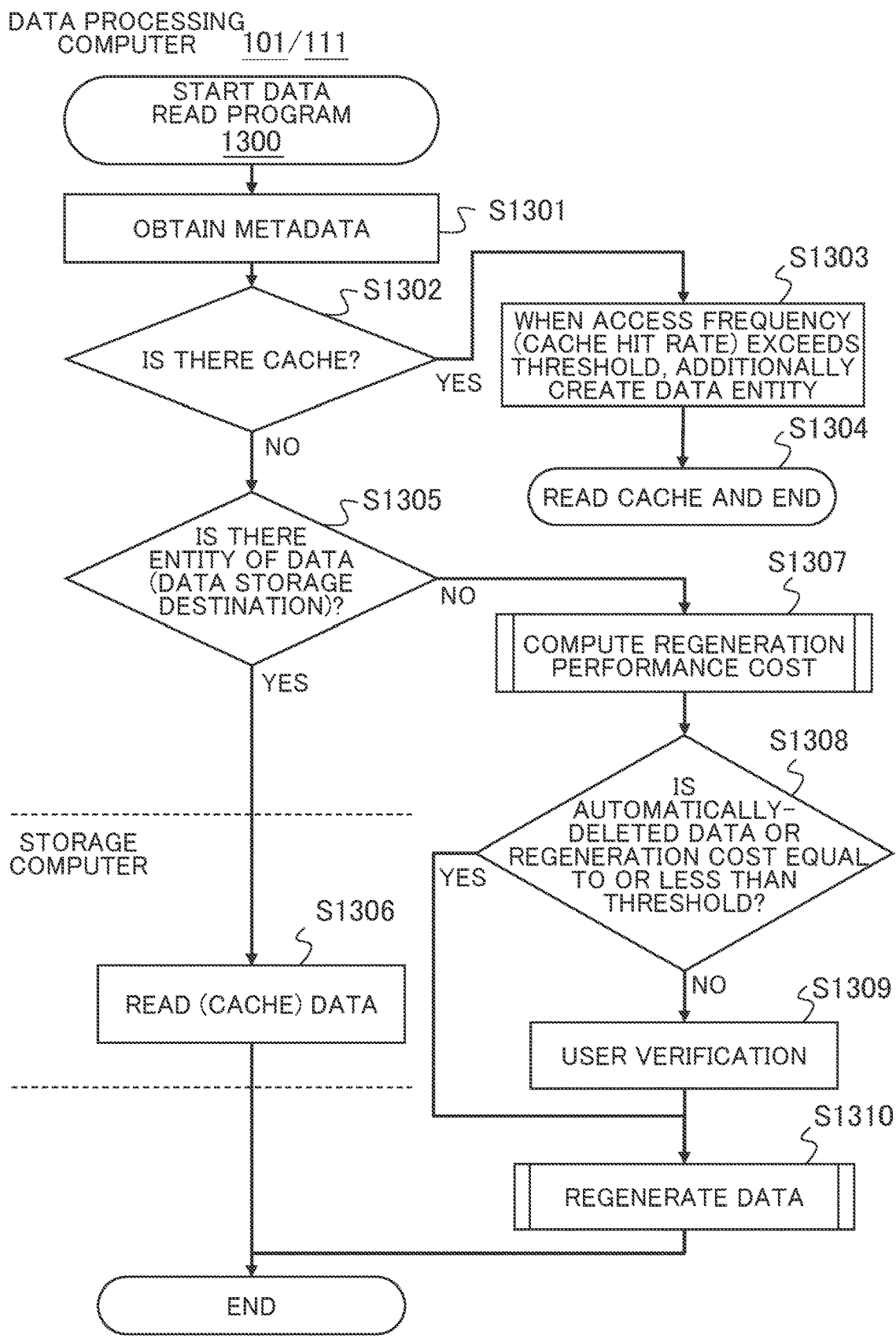
FIG. 13 is a drawing illustrating a flow of a process of a data read program stored in the memory of the data processing computer.

FIG. 13 illustrates a flow of a process of the data read program 1300 executed by the data processing computer 101/111 for inputting the data from the storage computer 102/112. Data reading occurs at a step at S1207 where the input data is read with the workflow execution program 1200, at a step at S1905 where the original data is replicated in the original data transfer process 1900 described later, and at a timing of a direct access to the data from the terminal computer 109 or the like (S1300).

To read data, the data read program 1300 first obtains the metadata corresponding to the data (S1301). The data read program 1300 confirms whether there is a cache of the data on the memory 202, on a high-speed storage device, or the like (S1302). Note that the cache may be on the data processing computer or may be on the storage computer.

In the case where there is a cache (S1302: YES), and when there is no entity of the data except for the cache and the access frequency to the cache exceeds the reference value described in the setting table 1100, the data read program 1300 creates an entity of the data using the cache on the storage device and updates the data storage destination 760 of the metadata 702 (S1303).

This procedure ensures arranging the newly created data only in a cache region first, and creating the entity of the data only when an access is actually made. That is, the entity of the data to which no access is made is not created, and therefore, an effect of a capacity reduction can be obtained. When there is a cache, reading the cache completes the data reading (S1304).

Note that, in the case of, for example, there is only a part of the data that needs a cache, it is possible to determine as "no cache" at a step of S1302 or regenerate the whole data using the data regeneration program 1500. By setting the regeneration requesting flag 770 of the metadata 702, regeneration of the data can additionally and collectively regenerate data that is set with the flag.

In the determination at Step 1302, when there is no cache (S1302: NO), the data read program 1300 confirms whether there is an entity of the data. specifically, the data read program 1300 can confirm that it is the data with no entity of the data but only the metadata existing by confirming, for example, that "the data storage destination 760 is not set" of the metadata 702 (S1305).

When there exists the entity of the data (S1305: YES), the data read program 1300 reads the data from the storage computer 102/112. Specifically, the data read program 1300 performs reading from the data storage region specified by the data storage destination 760 of the metadata 702 (S1306). The read content is cached so as to have a cache in the case where the determination of Step S1302 occurs again.

Note that, the data read program 1300 can use the protocol described in the tier information 902 of the storage configuration information table 900 for this protocol used in reading from the storage computer. The above-described tier information 902 can identify a value that corresponds to a value stored in the data storage destination 760 by, for example, searching it from the data storage region identifier 901. In accordance with the setting, update of the last access time 764 and the like of the metadata 702 are also performed.

Meanwhile, when it is determined that there is no data entity at Step S1305 (S1305: NO), the data read program 1300 computes the regeneration cost for regenerating the entity of the data (S1307). When the data with no entity was automatically deleted data or when the computational result of the above-described regeneration cost is lower than the reference described in the setting table 1100 (S1308: YES), the data read program 1300 regenerates the data (S1310).

Note that whether it is automatically deleted data or not can be determined by referring to the automatic deletion flag 769 of the metadata 702. This ensures achieving a seamless data automatic deletion. When the conditions of Step 1308 are not satisfied (S1308: NO), it is expected that there occurs a cost, such as certain period of time and cost, in association with the regeneration of the data, and therefore, the data read program 1300, for example, confirms if execution of the regeneration is allowed or not to the user in accordance with the setting (S1309). As the result of the confirmation, in the case where it is allowed, the data read program 1300 executes the regeneration (S1310).

Figure 14:
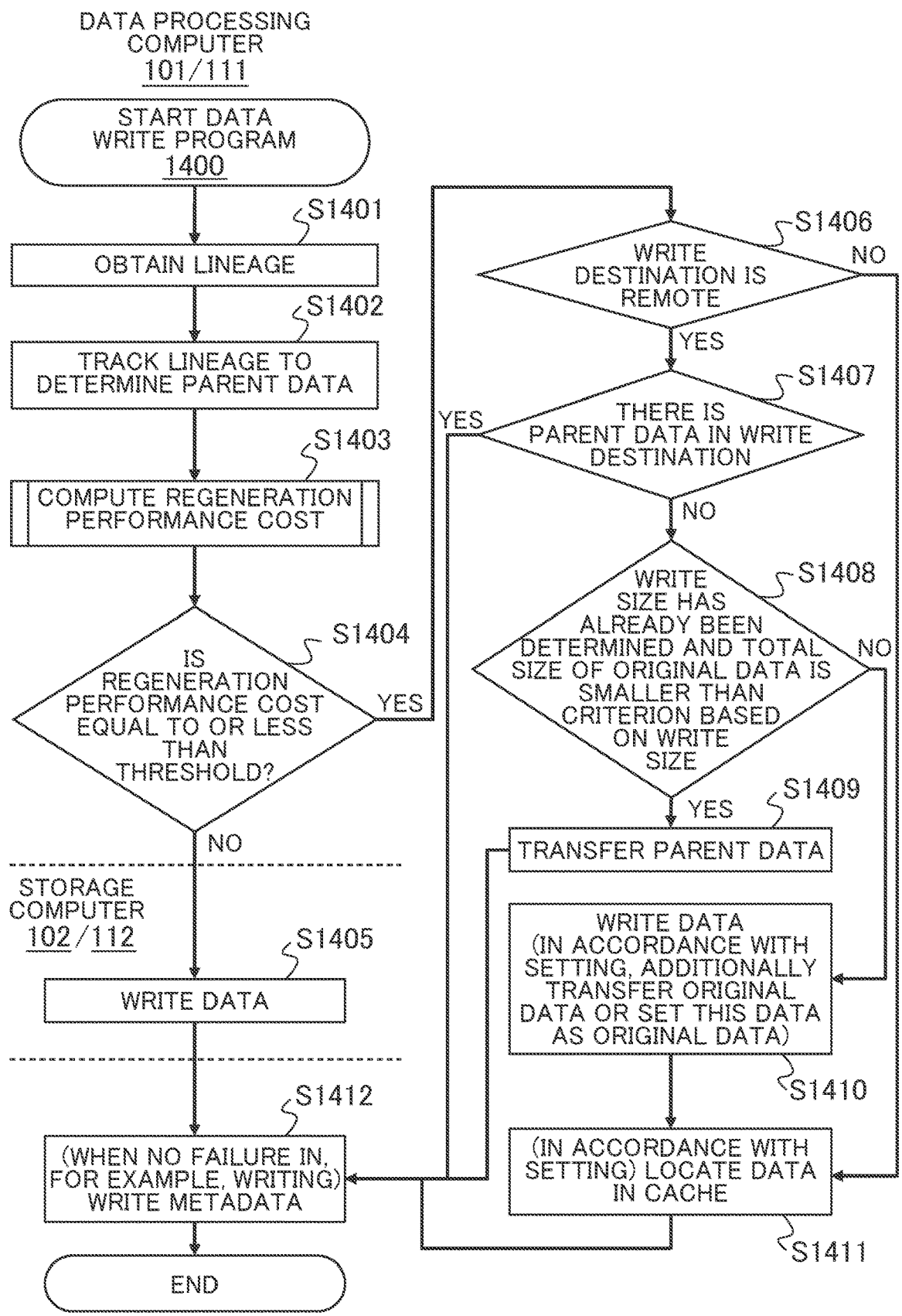
FIG. 14 is a drawing illustrating a flow of a process of a data write program stored in the memory of the data processing computer.

FIG. 14 illustrates a flow of a process of the data write program 1400 executed on the data processing computer 101/111 for outputting data to the storage computer 102/112. Writing out of data occurs at a step at S1209 where data is output with the workflow execution program 1200, at a step at S1905 where the original data is replicated in the original data transfer process 1900 described later, and at a timing of a direct access to the data from the terminal computer 109 or the like.

The data write program 1400 first obtains a lineage of the data to be written out (S1401). For the lineage obtained here, one that is in a state still before being written in the lineage table 601, such as one that is generated at Step S1208 in the workflow execution program 1200, may be obtained. The data write program 1400 confirms parent data of the data to be written out tracking the obtained lineage (S1402).

Next, the data write program 1400 computes the regeneration cost in the case where the data to be currently written out is attempted to be regenerated from the parent data (S1403). The parent data is the data (data of more previous generation) necessary for regenerating the data to be currently written out, and the original data is the data that further cannot be generated from other data in the parent data. The parent data is all the data from data in the generation immediately before the data to the original data.

The data write program 1400 compares this regeneration cost with the threshold described in the setting table 1100 (S1404), and when it is larger (S1404: NO), the data write program 1400 executes the data writing by commanding to the storage computer 102/112 (S1405).

The protocol used in this writing can be obtained from the storage configuration information table 900 or the like through the procedure described in Step S1306 in the data read program 1300 describe above. In the case of the successful writing, the data write program 1400 updates the content of the metadata 702, such as the data storage destination 760, the lineage at data generation/link number 761, the data size 763, and the last access time 764 (S1412).

Note that the determination from Step 1403 to Step 1404 can be replaced with the data deletion/management condition determining process 1800 described later. Specifically, the data write program 1400 determines whether the conditions for data deletion are satisfied using the data deletion/management condition determining process 1800, and when the conditions for data deletion are satisfied, it corresponds to the case where the above-described regeneration cost is larger than the reference, and therefore, the data is written at Step S1405.

Conversely, when the conditions of the data deletion are satisfied, it corresponds to the case where the regeneration cost is lower than the reference, and therefore, the data write program 1400 attempts to omit the data writing at from Step 1406 to Step 1411 described later. Using the data deletion/management condition determining process 1800 ensures performing a determination by considering detailed conditions other than the regeneration cost.

When the regeneration cost is determined to be lower than the reference at Step 1404 (S1404: YES), the data is not necessarily written right away but it is also possible to perform the regeneration when it is necessary. The data write program 1400 performs the following three checks to determine the behavior of this case. First, the data write program 1400 determines whether the write destination is a remote storage device (S1406).

Second, the data write program 1400 determines whether there are all the parent data necessary to regenerate the data to be currently written in the storage device at the write destination (S1407). Third, the data write program 1400 compares a total size of the parent data necessary for regenerating the data with a size of the data to be written (S1408).

In the above-described first determination (S1406), the data write program 1400 confirms that it is not writing onto a remote data storage region, such as a storage device on a public cloud with the wide area network 120 interposed in between, by referring to the tier information 902 in the storage configuration information table 900. When the write destination is not remote (S1406: NO), the data write program 1400 can arrange the data only in the cache region (S1411) to omit creating an entity of the data since it has already been confirmed that the regeneration cost is small at Step S1404. At this time, the automatic deletion flag 769 of the metadata 702 is set so as to handle it similarly to the automatically deleted one (S1411).

For such an omission of data entity creation, more detailed conditions can also be described in the setting table 1100. The data arranged only in the cache region can be materialized after confirming that there is actually an access by the procedure at Step S1303 of the data read program 1300 described above. At this time, the automatic deletion flag 769 of the metadata 702 is removed if it exists.

In the above-described second determination (S1407), the data write program 1400 considers a case where a trouble occurs in a network connection with the remote location and similar cases since it has already been confirmed that the write destination is remote from the above-described first determination. For example, even though the network connection is disconnected, when there is all the parent data necessary for regenerating the data to be currently written to the remote location, the data to be written can be remotely regenerated.

Therefore, the data write program 1400 confirms whether there are all those pieces of parent data in the remote storage device to be currently written or the storage device nearby. When all the parent data is at the remote location (S1407: YES), it is also possible to omit the data writing since it has already been confirmed that the regeneration cost is small at Step S1404. At this time, the data write program 1400 sets the automatic deletion flag 769 of the metadata 702 and handles the data similarly to the automatically deleted one.

For such an omission of data entity creation, more detailed conditions and another procedure can be described in the setting table 1100. For example, there is an advantage that substantially the same result as the data writing can be obtained without streaming the write data to the network with the remote location even in the case where the data having the same content as the data to be written is regenerated in the remote location from the parent data existing in the remote location.

The data write program 1400 has already confirmed that the write destination is remote but the parent data is not complete there from the above-described first and second determinations. Therefore, in the above-described third determination (S1408), the data write program 1400 determines whether to write the data to be currently written as usual or to arrange the parent data necessary for the regeneration in the remote location.

First, the data write program 1400 confirms whether the write data already has a determined size. Specifically, a first way for confirming is that this data writing can be found if it is the writing in association with data movement from a caller of the data write program 1400, and in that case, the data size is preliminarily determined. A second way for confirming is to confirm that the process has been completed by viewing the details of the execution time 634 in the lineage table 601. Alternatively, it is determined whether the size of the data has preliminarily been determined by viewing the stream process flag 865 in the process definition 802 and confirming that it is not a process that writes out sequential data while processing, such as a process referred to as a stream process.

With these confirmations, when the size of the data to be written has been determined, it is compared with the total size of the parent data, and when the total size of the parent data is smaller (S1408: YES), the data write program 1400 replicates (transmits) the parent data to the remote location instead of the data to be written (S1409). Alternatively, the data write program 1400 determines using the reference described in the setting table 1100, such as the total size of the parent data is smaller than double the size of the data to be written.

Meanwhile, when the data to be written is written as usual (S1410), the data write program 1400 additionally and asynchronously replicates the parent data in accordance with the setting described in the setting table 1100. Alternatively, it is possible to handle the data to be written as the original data instead of a replication of the parent data. The above-described asynchronous replication of the parent data can be performed in, for example, the original data transfer process 1900 described later.

When the data is handled as the original data, the data write program 1400 provisionally increases the number of original data use of the data utilization counter 762 of the metadata 702 in advance, and decreases the above-described provisionally increased number of original data use when the inherent original data is replicated. Whatever the case may be, in the case where the entity of the data is not created, the data write program 1400 sets the automatic deletion flag 769 of the metadata 702 to handle it similarly to the automatically deleted one.

When the above-described procedure according to these first, second, and third determinations described above and the determination results is completed, the data write program 1400 reflects changed points on the metadata and completes the writing process (S1412).

Figure 15:
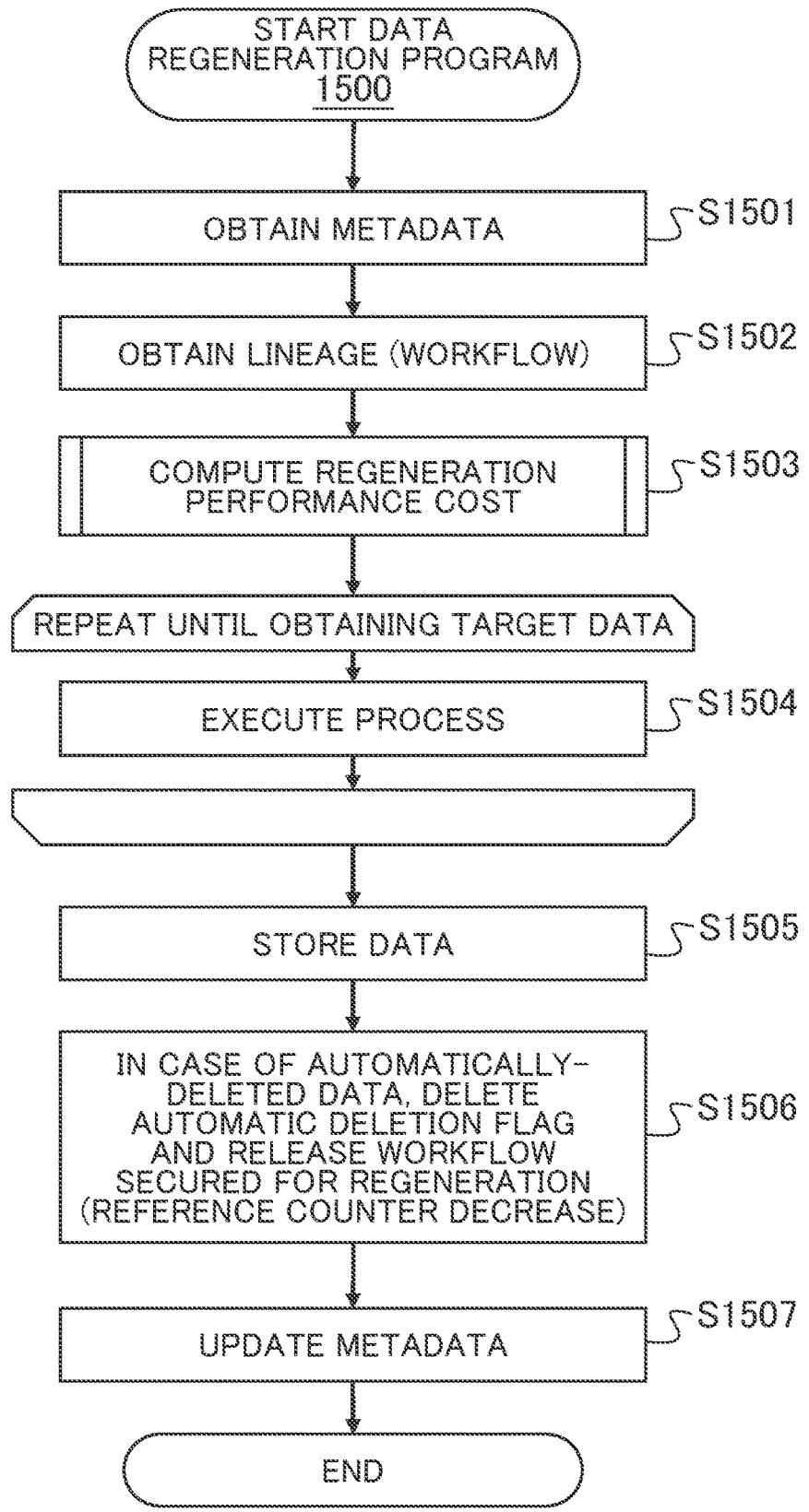
FIG. 15 is a drawing illustrating a flow of a process of a data regeneration program stored in the memory of the data processing computer.

FIG. 15 illustrates a flow of a process of the data regeneration program 1500 executed on the data processing computer 101/111. The data regeneration program 1500 is called from, for example, Step S1310 in the data read program 1300, Step S1708 of the data deleting and moving program 1700 described later, and Step S1304 of the data read program 1300 (when the data to which the regeneration requesting flag 770 is set is regenerated) (S1500). The specified deleted data is regenerated from its parent data by tracking the lineage.

Upon regenerating data, first, the data regeneration program 1500 obtains the metadata 702 corresponding to the data (S1501). Furthermore, the data regeneration program 1500 obtains the lineage and the workflow specified by the lineage at generation/link number 761 in the metadata 702 (S1502).

The data regeneration program 1500 computes the regeneration cost of the data to be regenerated by tracking the lineage (S1503). Specifically, the data regeneration program 1500 computes both the regeneration cost in the case where the lineage is tracked in a forward direction and the regeneration cost in the case where the lineage is tracked in a backward direction, and determines the regeneration direction with a lower cost.

Note that this regeneration direction does not necessarily correspond to the direction in which "one step in workflow" identified by "the lineage at generation/link number 761 of the metadata 702" is used, and may be determined by an evaluation of the latest regeneration cost on which, for example, values of the latest billing information table 1000 are reflected.

The data regeneration program 1500 obtains target data (S1504) by sequentially executing the process described in the process name 612 of the workflow definition table 600 from the regeneration direction with the lower cost and saves the regenerated data (S1505).

Note that, when the automatic deletion flag 769 is set, the data regeneration program 1500 deletes the automatic deletion flag 769 and releases the workflow secured for the regeneration when the data was deleted (S1506). Specifically, for the increased amount of the reference counter 617 of the workflow added at Step S1704 of the data deleting and moving program 1700 described later, the data regeneration program 1500 identifies the workflow by referring to the lineage at generation/link number 761 of the metadata 702 and decreases the reference counter 617. The reference counter 617 becomes zero and the workflow released from securing all may be freely deleted.

Finally, the data regeneration program 1500 updates the content of the metadata 702, such as the data storage destination 760, the lineage at generation/link number 761, the data utilization counter 762, the data size 763, the last access time/frequency 764, and the automatic deletion flag 769 (S1507).

Figure 16:
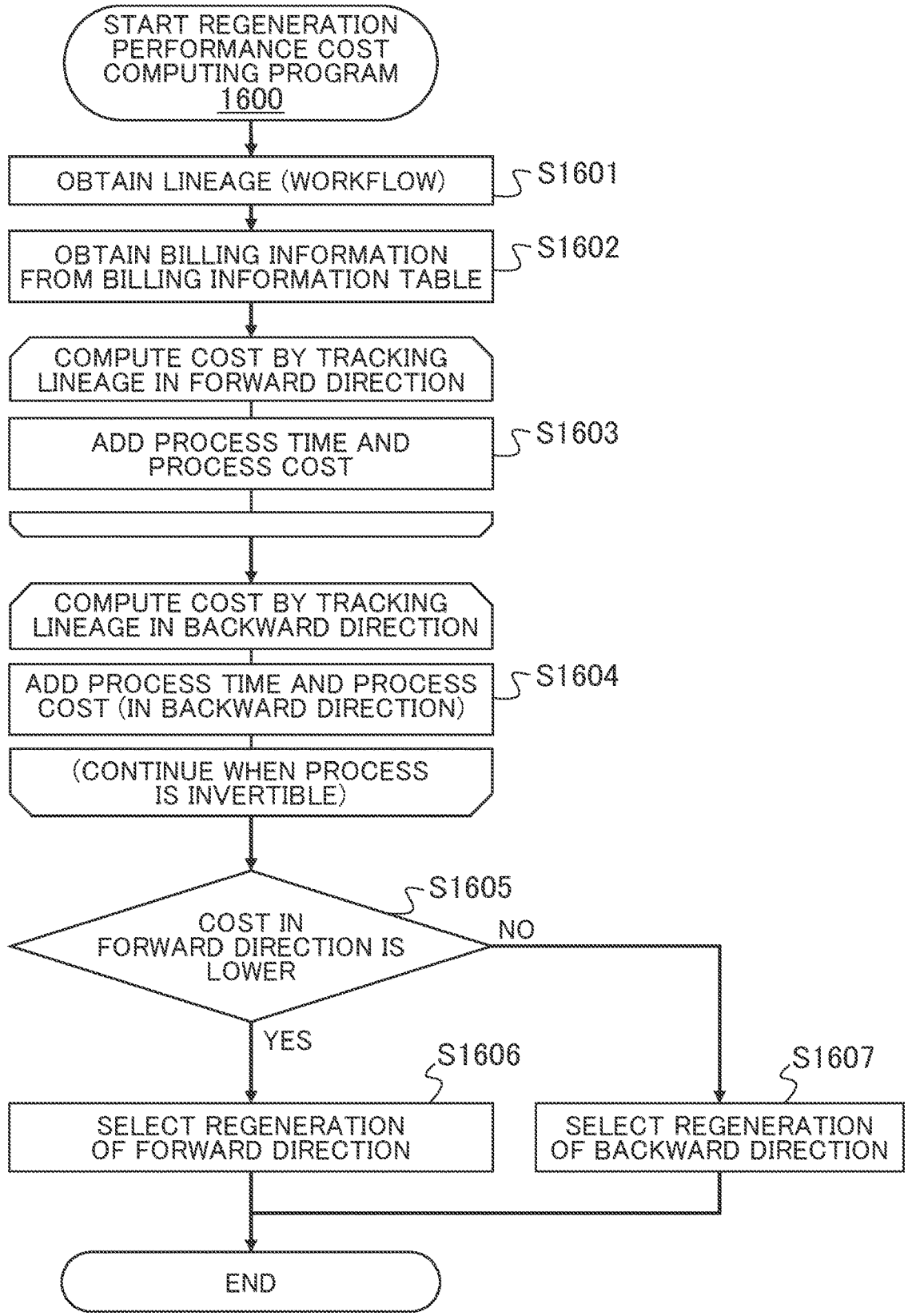
FIG. 16 is a drawing illustrating a flow of a process of a regeneration cost computing program stored in the memory of the data processing computer.

FIG. 16 illustrates a flow of a process of the regeneration cost computing program 1600 executed on the data processing computer 101/111. The regeneration cost computing program 1600 computes the regeneration cost computed based on the process time and/or process cost necessary for regenerating the specified data into two cases of the case where the lineage is tracked in the forward direction and the case where the lineage is tracked in the backward direction. Thus, the regeneration direction with the lower cost is determined and its regeneration cost is quantified. In the example described below, the regeneration cost is computed based on the process time and the process cost.

The regeneration cost computing program 1600 is called from, for example, Step S1307 of the data read program 1300, Step S1403 of the data write program 1400, and Step S1503 of the data regeneration program 1500 (S1600).

To compute the regeneration cost, first, the regeneration cost computing program 1600 refers to the metadata 702 of the data as a target, and obtains the lineage and the workflow pertaining to its regeneration (S1601). The regeneration cost computing program 1600 refers to the billing information table 1000, and obtains the latest billing information for estimating the process cost generated by the regeneration (S1602).

The regeneration cost computing program 1600 computes the "process time" and the "process cost" necessary for the regeneration (S1603) by tracking the lineage in the forward direction and repeatedly adding the "process time" and the "process cost" of the processes at the respective steps of the workflow until the data entity that would serve as original data in this regeneration is found. This is referred to as a "regeneration cost in the forward direction."

The regeneration cost computing program 1600 similarly tracks the lineage in the backward direction, and computes the "process time" and the "process cost" in the regeneration from the backward direction (S1604). This is referred to as a "regeneration cost in the backward direction." However, to track the lineage in the backward direction, it is necessary that each process provides an inverse transformation. If a process without the inverse transformation was found, the "regeneration cost in the forward direction" is employed at the next Step S1605 as the "regeneration cost in the backward direction" is incomputable.

When both the regeneration cost in the forward direction and the regeneration cost in the backward direction could be computed, the regeneration cost computing program 1600 compares the costs (S1605). Specifically, there are a method that has priority orders of the time and the cost preliminarily determined in the setting table 1100, a method that confirms whether each of them is within the range of the reference value described in the setting table 1100, a method that performs a comparison with the reference value by converting into one index by a calculation such as "process time"×"process time weight"+"process cost"×"process cost weight" by using weights, and similar method.

It is not limited to the above-described calculating formula, and another calculating formula, algorithm, and the like may be used as long as the costs can be compared. Alternatively, algorithm, such as a formula and a script program, stored in the setting table 1100 can be used.

When the regeneration cost in the forward direction is lower (S1605: YES), the regeneration cost computing program 1600 selects the regeneration in the forward direction (S1606). When the regeneration cost in the backward direction is lower (S1605: NO), the regeneration cost computing program 1600 selects the regeneration in the backward direction (S1607). This ensures obtaining the regeneration cost from the regeneration direction with a lower cost.

Note that, in either case of tracking the lineage in any direction at Step S1603 and S1604 described above, the regeneration cost computing program 1600 refers to the value of the reproducibility 866 of the process definition 802 to confirm the presence/absence of reproducibility. When there is no reproducibility in the process, the same data cannot be generated again even though the same input data is used. Accordingly, the lineage cannot be tracked any more when there is no reproducibility, similarly to the case without inverse transformation.

When, for example, the usage fee is modified or hardware is replaced, the process time and the process cost possibly change from the values estimated in the past. Therefore, the regeneration cost computing program 1600 may compute the regeneration cost of the deleted data again when, for example, the system configuration is changed.

Figure 17:
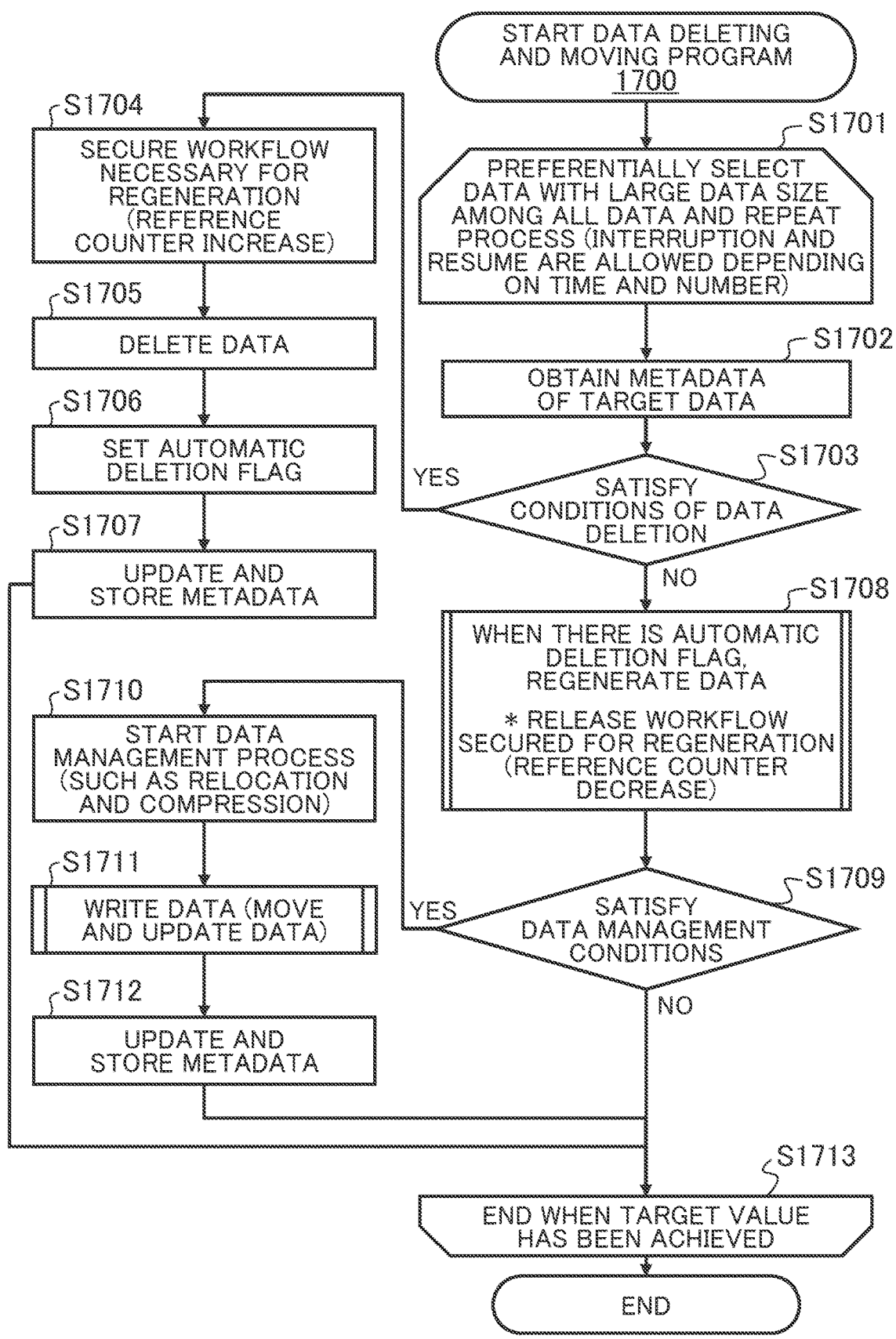
FIG. 17 is a drawing illustrating a flow of a process of a data deleting and moving program stored in the memory of the data processing computer.

FIG. 17 illustrates a flow of a process of the data deleting and moving program 1700 executed on the data processing computer 101/111. The data deleting and moving program 1700 can be started to be executed by a mechanism that periodically executes a program, referred to as, for example, existing cron daemon or crontab command (S1700).

The data deleting and moving program 1700 extracts data that may be deleted and data that may be rearranged or compressed in accordance with, for example, the settings in the setting table 1100, and executes those operations. Performing data deletion and data compression can directly reduce the data capacity. Performing the data rearrangement ensures more effectively using the capacity of a high-performance storage device high in unit price of capacity (the capacity of the high-performance storage device can be reduced).

Such a series of data operation is referred to as "data management." While data deletion is also included in the data management, it has different characteristics from those of other operations in that the target disappears. Therefore, in the embodiment, it is also referred to as the "data deletion" independently from the "data management" for convenience of explanation.

The data deleting and moving program 1700 attempts to perform the "data deletion" and the "data management" more preferentially to ones with large data size among all the data. Giving priority to the ones with large data size ensures promptly enjoying a part having a large effect of data deletion and data management.

Specifically, the data deleting and moving program 1700 preferentially processes the ones with large data size by any methods including a method that sorts and checks from the ones with large data size in order, a method in which the larger the data size is, the shorter the cycle for checking becomes, a method that preliminarily extracts the ones with larger data size than a threshold, and combinations thereof (S1701). Note that the data size can be confirmed by viewing a value of the data size 763 stored in the metadata 702.

Next, the data deleting and moving program 1700 obtains the metadata 702 of the data as a target of the data deletion and management (S1702), and determines whether the conditions of the data deletion are satisfied in the data deletion/management condition determining process 1800 described later (S1703). For example, one to which the automatic deletion flag 769 is set of the metadata 702 is already automatically deleted, and therefore, it is not a deletion target.

When the conditions of the data removal are satisfied (S1703: YES), the data deleting and moving program 1700 secures a workflow necessary for the regeneration such that the regeneration is possible even the data is deleted (S1704). Specifically, the data deleting and moving program 1700 refers to the lineage at generation/link number 761 of the metadata 702 to identify the workflow, and increases its reference counter 617. At this time, in conjunction with the securement of the workflow, the process used in the workflow can also be secured using the mechanism of the reference counter. Releasing the workflow can also release the conjunctly secured process.

The data deleting and moving program 1700 deletes the data (S1705), and records that the data is automatically deleted (S1706) by setting the automatic deletion flag 769 of the metadata 702. The data deleting and moving program 1700 deletes the data storage destination 760 of the metadata 702 with a content emptied by the deletion, and saves the metadata (S1707). The data deleting and moving program 1700 repeats the loop at Step S1701 and thereafter until the data capacity reduction target described in the setting table 1100 is reached (S1713).

Meanwhile, when the conditions of the data deletion are not satisfied (S1703: NO), the data deleting and moving program 1700 calls the data regeneration program 1500 to regenerate the deleted data (S1708). Note that when no access has been made to the deleted data, the data regeneration does not necessarily be performed immediately depending on the setting.

However, even in such a case, when the automatic deletion flag 769 of the metadata 702 is set, the data deleting and moving program 1700 can promptly regenerate the data in order to minimize a risk affected by the automatic deletion. When the regeneration is performed, the data regeneration program 1500 deletes the automatic deletion flag 769 and releases the workflow secured for the regeneration too.

Next, the data deleting and moving program 1700 determines whether the conditions of the data management are satisfied in the data deletion/management condition determining process 1800 described later (S1709) similarly to the determination of the above-described conditions of the data deletion. When the conditions of the data management are satisfied (S1709: YES), the data deleting and moving program 1700 starts a data management process in accordance with the settings, such as rearrangement and compression of data (S1710).

Specifically, for the data rearrangement, the data deleting and moving program 1700 obtains information, such as a protocol for performing input to and output from tiers of the movement origin and the movement destination described in the settings, from the tier information 902 of the storage configuration information table 900. For the data compression, the data deleting and moving program 1700 obtains information such as a compression method from the setting table 1100 and starts the compression process.

Next, the data deleting and moving program 1700 calls the above-described data write program 1400 to write the data onto the rearrangement destination or write the compressed data (S1711), and finally updates and saves the changed metadata (S1712). The data deleting and moving program 1700 repeats the loop at Step S1701 and thereafter until the data capacity reduction target described in the setting table 1100 is reached (S1713).

Note that the data to which the real-time data flag 766 of the metadata 702 is set, such as video data, voice data, and signal data, needs to secure certain responsivity and bandwidth at the time of input/output. Such data possibly cannot permit the influence of delayed or crowded network, and therefore, in particular, such data can be removed from the target of data rearrangement to, for example, a remote storage device via the wide area network 120. Since the data to which the compressed flag 767 of the metadata 702 is set is already compressed, it can be removed from the target of data compression. When data compression is newly performed, the compressed flag 767 is set.

Figure 18:
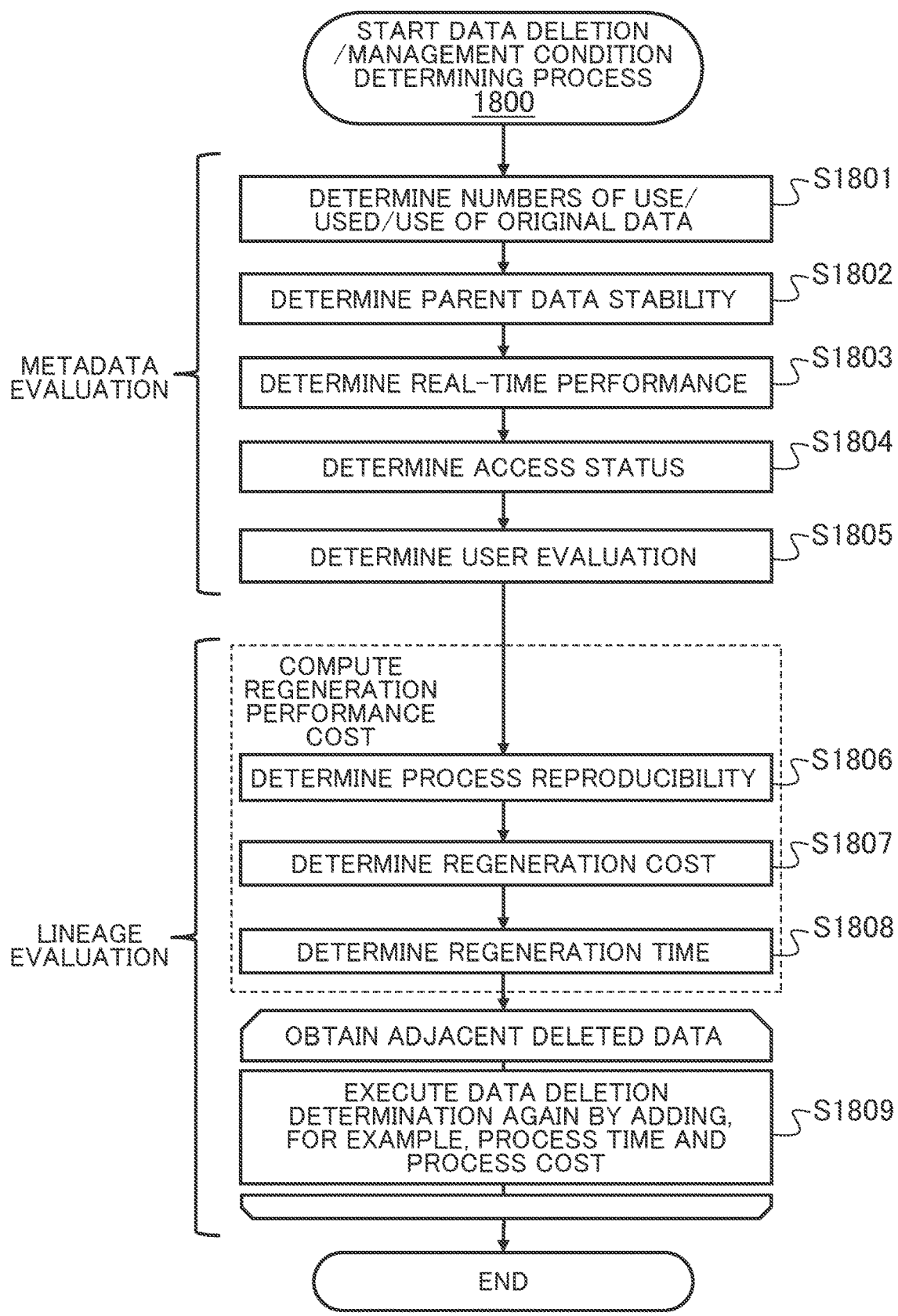
FIG. 18 is a drawing illustrating a flow of a data deletion condition and management condition determining process of the data deleting and moving program stored in the memory of the data processing computer.

FIG. 18 illustrates a flow of the data deletion/management condition determining process 1800 in the data deleting and moving program 1700 executed on the data processing computer 101/111. In accordance with a reference value stored in the setting table 1100, the data deletion/management condition determining process 1800 determines whether to perform the data deletion and the data management. Note that only a part of the reference described below may be used.

Specifically, when it is called from Step S1703 of the data deleting and moving program 1700, the data deletion/management condition determining process 1800 determines whether the data deletion is possible. When it is called from Step S1709, the data deletion/management condition determining process 1800 determines whether the data management, such as rearrangement and compression of the data, is possible. While the procedure of the determination process is the same in any case, the reference value in the used setting table 1100 differs.

The data deletion/management condition determining process 1800 is divided into a determination from Step S1801 to S1805 that performs the determination by referring mainly to the metadata and a determination from Step S1806 to S1809 that performs the determination by referring mainly to the lineage.

In the determination that uses the metadata, values of the number of use/the number of used/the number of original data use are first confirmed (S1801). Specifically, the data deletion/management condition determining process 1800 refers to the data utilization counter 762 of the metadata 702 and compares it with the threshold described in the setting table 1100. When the number of use is larger than the threshold, the data is removed from the target of deletion and management. This is because the data that has been generated using many pieces of data cannot be regenerated when even one piece among these pieces of data lacks, and thus, it is considered that the data is potentially easily unable to be regenerated.

When the number of non-use is larger than the threshold, the data is removed from the target of deletion and management. This is because it is potentially considered that there are large number of pieces of data that are possibly regenerated using the data. When the number of original data use is larger than the threshold, the fact that the regeneration is not possible from other data once the data is lost makes it high in importance, and therefore, it is removed from the target of the data deletion by a particularly severe reference.

Next, in particular, when the data deletion is performed, the data deletion/management condition determining process 1800 determines about a data storage state (stability) of the parent data necessary for regenerating the data (S1802). The parent data necessary for regenerating the data is preferred to be stored in the storage device with which data does not disappear even when a hardware breakdown, such as RAID, and furthermore, it is necessary that the content of the data is not rewritten.

Specifically, the data deletion/management condition determining process 1800 refers to the storage device information 903 of the storage configuration information table 900, and confirms whether the type of the storage device satisfies predetermined reference, such as "JBOD is not allowed." The data deletion/management condition determining process 1800 refers to the tier information 902, and confirms that all the past versions of data can be accessed by the version management. Alternatively, the data deletion/management condition determining process 1800 refers to the access control information 765 of the metadata 702, and confirms, for example, that the writing is inhibited.

Next, the data deletion/management condition determining process 1800 determines whether the target data of determination is the data that requests a real-time performance, such as a video, an audio, and a signal (S1803). Whether the target data is requesting the real-time performance or not can be determined by referring to the real-time data flag 766 and the data extension 768 of the metadata 702.

When it is real-time data, the data deletion/management condition determining process 1800 can inhibit the deletion by setting and inhibit the rearrangement to a remote storage device that possibly has a delay in a network communication.

Alternatively, the data deletion/management condition determining process 1800 can obtain performance information of the tier information 902 of the storage configuration information table 900 to determine whether rearranging of the data is allowed or not based on, for example, the maximum responsivity and the lowest guaranteed bandwidth, even with a local storage device.

Next, the data deletion/management condition determining process 1800 determines about an access status, such as the data has not been used for a long period of time (S1804).

Specifically, the data deletion/management condition determining process 1800 refers to the last access time/frequency 764 of the metadata 702, and performs a determination with scales, such as whether the elapsed time since the last access exceeds the reference and the latest access frequency is equal to or less than the reference, to determine whether it is possible to delete, rearrange, and compress the data or not.

Besides, adding a reference such as a "probability of access occurrence to data that had no access for one year" ensures confirming that an overload, such as the regeneration process cannot keep up, does not happen even when the deleted data is concurrently accessed. Note that, for the access frequency, any procedures, such as a computing method that counts the execution time 634 recorded in the lineage and a method that stores the counted result in the last access time/frequency 764 of the metadata 702 and uses it, may be used.

Next, the data deletion/management condition determining process 1800 determines about a user evaluation of the data (S1805). Various contents are possible as specific contents of the user evaluation, but in any case, it is determined whether the value stored in the metadata 702 satisfies the reference value. For example, when it is a user evaluation like the number of pressed "like" button displayed on a user interface screen, the data deletion/management condition determining process 1800 determines whether the number exceeds the reference value. Alternatively, when an "important" mark can be put on important data in business, the data deletion/management condition determining process 1800 determines presence/absence of the flag.

In the determination that uses the lineage, first, the data deletion/management condition determining process 1800 tracks the lineage and determines presence/absence of the reproducibility of the process that has generated the data (S1806). Specifically, the data deletion/management condition determining process 1800 refers to the values of the reproducibility 866 of the process definition 802 to determine whether there is the reproducibility. When there is no reproducibility of the process, the same data cannot be generated again once the data is deleted, and therefore, the data cannot be the deletion target. Note that when the regeneration is possible based on the output data by backwardly tracking the lineage, it can be the target of the data deletion on the premise of the regeneration in the backward direction.

The data deletion/management condition determining process 1800 determines whether the cost generated when the regeneration is performed satisfies the reference (S1807), or the period necessary for the process for regeneration (S1808) satisfies the reference. The data deletion/management condition determining process 1800 compares between the process times and the process costs obtained by tracking the lineage in the forward sequence and the backward sequence to select the direction with the lower cost. Determinations of these Steps S1806 to S1808 are the same as the determination whether the regeneration cost computed by the regeneration cost computing program 1600 satisfies the reference value, and the regeneration cost computing program 1600 may execute it.

When it is deletable by clearing the determinations so far, finally, the data deletion/management condition determining process 1800 confirms all the data adjacent on the lineage, and, when there is automatically deleted data among it, retries the determination whether it is possible to delete the automatically deleted data (S1809) or not.

Specifically, the data deletion/management condition determining process 1800 retries the determination from Step S1801 to S1808 described above, and even when one piece of data is newly deleted, confirms whether the regeneration cost and the regeneration time fit within the references. When there is data that does not satisfy the reference, the data deletion/management condition determining process 1800 regenerates the data by, for example, setting the regeneration requesting flag 770 of the metadata 702. Besides, adding a reference, such as "the maximum number of generations allowed for the already-deleted data to sequentially align" ensures reducing an excessively lengthened section without data.

Figure 19:
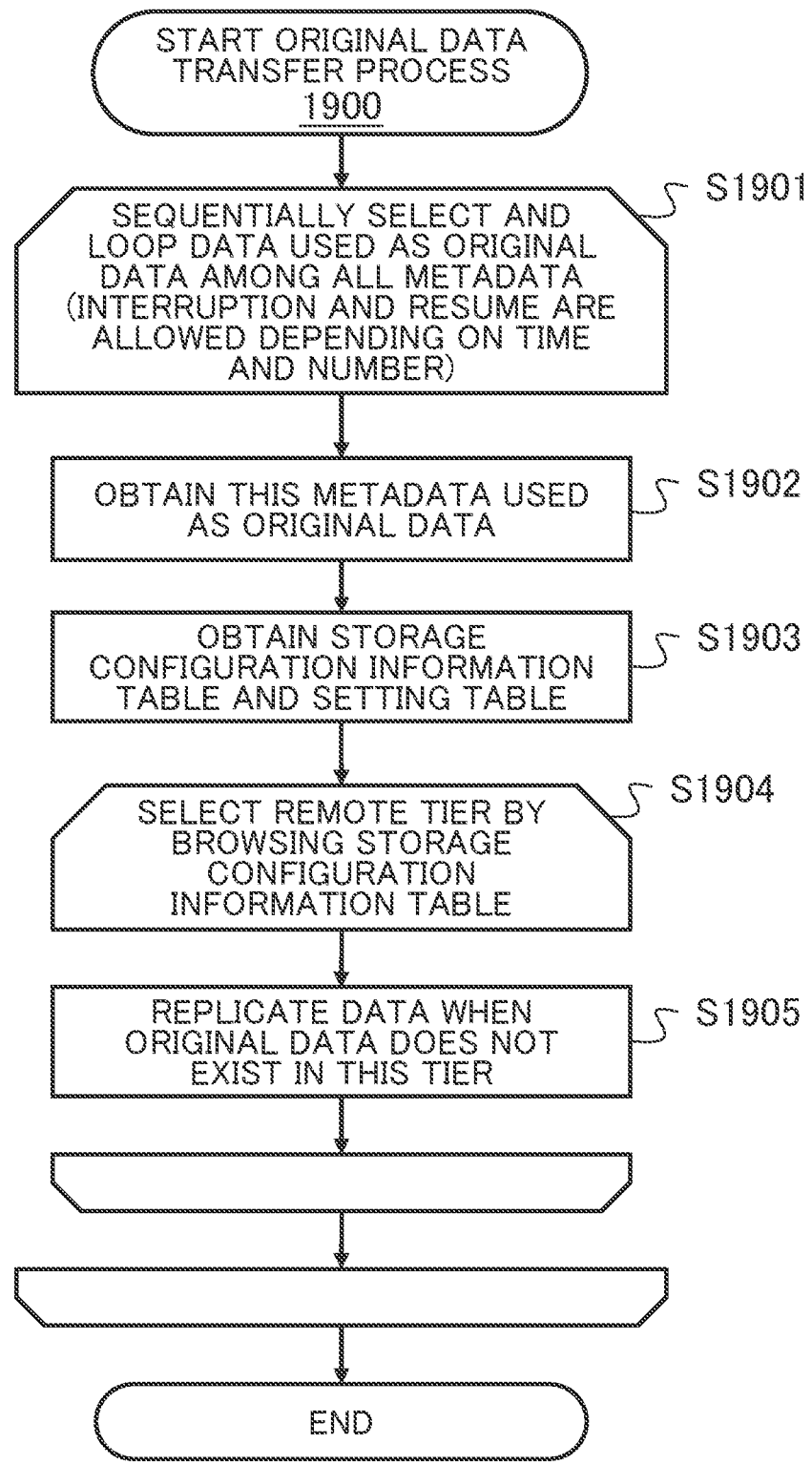
FIG. 19 is a drawing illustrating a flow of an original data transfer process that can be called from, for example, the data deleting and moving program and the workflow execution program stored in the memory of the data processing computer.

FIG. 19 illustrates a flow of the original data transfer process 1900 executed on the data processing computer 101/111. The original data transfer process 1900 can be called, in order to transfer the original data to a tier (the storage device) in the remote location, before the termination of the data deleting and moving program 1700 or from a mechanism that periodically executes a program referred to as, for example, existing cron daemon or crontab command. Preliminarily arranging the original data in the remote location ensures remotely regenerating data from the original data in the remote location even when a communication failure occurs in the network.

The original data transfer process 1900, first, sequentially selects the data used as original data among all the metadata (S1901), and obtains the metadata (S1902). Furthermore, the storage configuration information table 900 and the setting table 1100 are obtained (S1903).

Next, the original data transfer process 1900 sequentially selects the tiers in the remote location by viewing the storage configuration information table 900 (S1904). When there is no replication of the original data identified by the metadata obtained at Step S1902 existing in the tiers selected at Step 1904, the replication is created (S1905). This is repeated, and when all the replications of the original data are created, the original data transfer process 1900 is terminated.

The following formula (1) is an example of formula for quantifying the values of the data that can be used in the data deletion condition and management condition determining process of the data deleting and moving program 1700 stored in the memory 202 of the data processing computer.

[Math. 1]

$$V = \frac{\sum_{1}^{n} f_i(P_i) w_i}{n} \quad (1)$$

This example standardizes each of n pieces of parameters from parameters P1 to Pn with n pieces of functions f1 to fn that standardizes a range and a variation of the value. Furthermore, an arithmetic average V of n pieces of values obtained by multiplying each of values of the functions f1 to fn by weights w1 to wn is computed. This quantifies the values of the data. At this time the weights w1 to wn indicate degrees of importance of the respective parameters, and indicate degrees that data deletion and management should be done, such as data with a low data value V may be deleted.

For example, using a part or all the parameters used in the determination from Step S1801 to S1809 of the data deletion/management condition determining process 1800, it is possible to convert the data into an index indicating the values of one piece of data by the above-described formula (1). This not only ensures determining whether it is possible to delete, rearrange, and compress data or not with the above-described data values as an index, but also has an advantage that this part of determination process does not have to be changed even though the number of the used parameter is increased or decreased.

Figure 20:
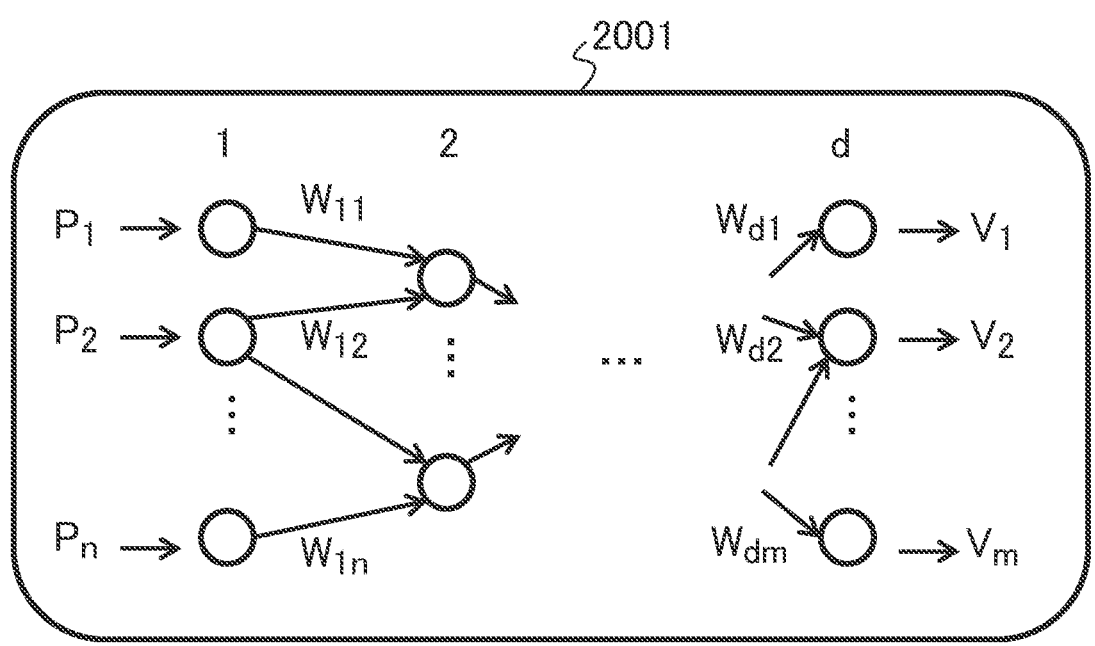
FIG. 20 is a function for quantifying values of data that can be used in the data deletion condition and management condition determining process of the data deleting and moving program stored in the memory of the data processing computer.

Note that while it is possible that an administrator or the like can describe the values of the weights in the setting table 1100, it is also possible to compute the values of the weights using a method for machine learning, such as deep learning of the neural network. FIG. 20 illustrates an example of a neural network 2001. In particular, when the machine learning, such as the deep learning of the neural network, is used, dimensionality m of an output and a depth d to an output layer can be increased.

For example, a different value for each operation, such as a "data value that determines whether it is possible to delete or not" V1, a "data value that determines whether it is possible to move data or not" V2, and a "data value that determines whether it is possible to compress or not" V3, can be computed. It is also possible to further subdivide and compute, for example, a value for each data movement origin and data movement destination from m pieces of outputs of V1 to Vm. This operation can be expressed by the following formula (2) with, when the conversion by the above-described neural network 2001 is expressed as a function g, the right side being a function with the above-described parameters P1 to Pn as arguments of the function g and the left side being an arrangement of variables from V1 to Vm.

[Math. 2]

$$(V_1, V_2, \ldots, V_m) = g(f_1(P_1), f_2(P_2), \ldots, f_n(P_n)) \qquad (2)$$

Note that it is not limited to the above, but the degrees of importance of the respective parameters can be computed using various methods.

As described above, the computer system of the embodiment computes the regeneration cost by analyzing the lineage that records the generation process of the intermediate data, and automatically deletes the intermediate data with the regeneration cost within the reference. The automatic deletion is recorded in the metadata, and when an access is made to the automatically-deleted intermediate data, the data is automatically regenerated using the lineage. This ensures hiding that the data is automatically removed from the user.

Note that the present invention is not limited to the above-described embodiment, but various modifications are included. For example, the above-described embodiment has described the present invention in detail for a comprehensible description, and it is not necessarily limited to include all the described configurations. It is possible to replace a part of a configuration of a certain embodiment with a configuration of another embodiment, and it is also possible to add a configuration of another embodiment to a configuration of a certain embodiment. Another configuration can be added to, deleted from, and replaced with a part of a configuration of each embodiment.

Each configuration, functionality, processing unit, and the like described above may be achieved by hardware by designing a part or all of them with, for example, an integrated circuit. Each configuration, functionality, and the like described above may be achieved by software by a processor interpreting and executing a program that achieves each functionality. Information of the program that achieves each functionality, tables, files, and the like can be placed in a memory, a storage unit, such as a hard disk and a Solid State Drive (SSD), or a storing medium, such as an IC card and an SD card.

Control lines and information lines considered to be necessary for description are illustrated, and all the control lines and information lines as a product are not necessarily illustrated. In practice, almost all the configurations may be considered to be mutually coupled.

What is claimed is:

1. A computer system comprising:
one or more processors; and
one or more storage devices,
wherein the one or more storage devices store management information that manages a workflow and a deletion flag that indicates deletion of data in the workflow hidden from a user,
the one or more processors:
execute a workflow that includes one or more processes that convert input data into output data;
include information of a lineage of the executed workflow including information of the input data and the output data in the management information;
delete data selected from data in the executed workflow, and set the deletion flag of the selected data in the management information;
in response to an access to first data to which the deletion flag is set, regenerate the first data based on the management information and remove the deletion flag of the first data in the management information;
when a number of use times that indicates a number of data necessary for regenerating target data indicated by the management information is larger than a threshold, remove the target data from a deletion target;
when a number of used times that indicates a number of data generated using the target data indicated by the management information is larger than a threshold, remove the target data from a deletion target; and
when the management information indicates that the target data is original data unable to be regenerated from other data, remove the target data from a deletion target.

2. The computer system according to claim 1,
wherein the one or more processors, based on a regeneration time and a regeneration cost of target data indicated by the management information, determine whether to delete the target data.

3. The computer system comprising:
one or more processors; and
one or more storage devices,
wherein the one or more storage devices store management information that manages a workflow and a deletion flag that indicates deletion of data in the workflow hidden from a user,
the one or more processors:
execute a workflow that includes one or more processes that convert input data into output data;
include information of a lineage of the executed workflow including information of the input data and the output data in the management information;
delete data selected from data in the executed workflow, and set the deletion flag of the selected data in the management information;
in response to an access to first data to which the deletion flag is set, regenerate the first data based on the management information and remove the deletion flag of the first data in the management information;
with respect to deletion of target data, reserve a workflow used in regenerating the target data in the management information; and inhibit deletion of the reserved workflow from the management information.

4. The computer system comprising:
one or more processors; and
one or more storage devices,
wherein the one or more storage devices store management information that manages a workflow and a deletion flag that indicates deletion of data in the workflow hidden from a user,
the one or more processors:
  execute a workflow that includes one or more processes that convert input data into output data;
  include information of a lineage of the executed workflow including information of the input data and the output data in the management information;
  delete data selected from data in the executed workflow, and set the deletion flag of the selected data in the management information;
  in response to an access to first data to which the deletion flag is set, regenerate the first data based on the management information and remove the deletion flag of the first data in the management information;
  with respect to deletion of target data, reserve a workflow used in regenerating the target data in the management information; and
  delete the reserved workflow from the management information after regenerating all deleted data needed to be regenerated using the reserved workflow.

5. The computer system according to claim 1,
wherein the one or more processors determine whether to delete target data based on a preliminarily set data deletion condition, and
the one or more processors determine whether to perform one of rearrangement and compression of the target data after the target data is determined not to be deleted.

6. The computer system according to claim 1,
wherein the one or more processors, when deleted data is regeneratable in both a forward direction and a backward direction of a workflow of the deleted data, regenerate the deleted data in the direction with a lower regeneration cost based on a regeneration time and a regeneration cost of the deleted data.

7. The computer system according to claim 1,
wherein the one or more processors
  when target data satisfies a deletion reference of a rearrangement destination, delete the target data without rearranging, and set a deletion flag of the target data in the management information.

8. The computer system according to claim 1,
wherein the one or more processors, when a total size of parent data necessary for regenerating write data that should be transmitted to a write destination is smaller than a reference based on a size of the write data, transmit the parent data to the write destination without transmitting the write data to the write destination.

9. The computer system according to claim 1,
wherein the one or more processors repeat data deletion, compression, and move until a data capacity of a predetermined storage device reaches a preset target value.

10. The computer system according to claim 1,
wherein the one or more storage devices include a cache region and a data storage region, and
wherein the one or more processors:
  determine a regeneration cost of target data based on a regeneration time and a regeneration cost of the target data indicated by the management information;
  write the target data in the cache region without writing the target data in the data storage region, and set a deletion flag of the target data in the management information when the regeneration cost is smaller than a threshold;
  write the target data in the data storage region and remove the deletion flag when accesses exceeding a threshold are made to the target data written in the cache region.

11. The computer system according to claim 1,
wherein the one or more processors determine whether deleting of target data is allowed or not based on a value of a preliminarily specified parameter stored in the management information,
the parameter includes one or more of a number of use times that indicates a number of data necessary for regenerating the target data, a number of used times that indicates a number of data generated using the target data, a number of original data use of the target data, a storage state of parent data necessary for regenerating the target data, a real-time performance of the target data, an access status of the target data, a user evaluation of the target data, reproducibility of a process that generates the target data, a regeneration cost of the target data, a regeneration time of the target data, and an effect on deleted data adjacent in the workflow of the target data.

12. The computer system according to claim 1,
wherein the one or more processors:
  using a parameter used in determining whether deleting of delete target data is allowed or not, quantify a value of the target data; and
  execute a process selected from deletion, compression, and move of the target data based on the value.

13. The computer system according to claim 1,
wherein the management information manages a storage destination of data in the workflow,
the one or more processors:
when original data that is not generable from other data is not replicated in a predetermined tier in a plurality of tiers in the management information, create a replication of the original data in the predetermined tier.

* * * * *